US009574826B2

United States Patent
Akers et al.

(10) Patent No.: US 9,574,826 B2
(45) Date of Patent: Feb. 21, 2017

(54) CRUCIBLE AND DUAL FREQUENCY CONTROL METHOD FOR SEMI-LIQUID METAL PROCESSING

(71) Applicants: Ronald R. Akers, Guntersville, AL (US); Alan Koch, St. Louis, MO (US)

(72) Inventors: Ronald R. Akers, Guntersville, AL (US); Alan Koch, St. Louis, MO (US)

(73) Assignee: Ajax Tocco Magnethermic Corporation, Warren, OH (US)

( * ) Notice: Subject to any disclaimer, the term of this patent is extended or adjusted under 35 U.S.C. 154(b) by 339 days.

(21) Appl. No.: 13/966,616

(22) Filed: Aug. 14, 2013

(65) Prior Publication Data

US 2014/0083250 A1   Mar. 27, 2014

Related U.S. Application Data

(60) Provisional application No. 61/706,586, filed on Sep. 27, 2012.

(51) Int. Cl.
| | |
|---|---|
| *C22B 9/00* | (2006.01) |
| *F27D 11/06* | (2006.01) |
| *B22D 1/00* | (2006.01) |
| *F27B 14/06* | (2006.01) |
| *F27B 14/20* | (2006.01) |

(52) U.S. Cl.
CPC .................. *F27D 11/06* (2013.01); *B22D 1/00* (2013.01); *C22B 9/003* (2013.01); *F27B 14/061* (2013.01); *F27B 14/20* (2013.01); *Y02P 10/253* (2015.11)

(58) Field of Classification Search
CPC .................................... C22B 9/22; C22B 21/06

USPC ............................................. 75/10.15, 10.67
See application file for complete search history.

(56) References Cited

U.S. PATENT DOCUMENTS

| | | | |
|---|---|---|---|
| 3,478,156 A | 11/1969 | Segsworth | |
| 4,434,837 A | 3/1984 | Winter et al. | |
| 4,465,118 A | 8/1984 | Dantzig et al. | |
| 5,219,018 A | 6/1993 | Meyer | |
| 5,758,707 A | 6/1998 | Jung et al. | |
| 6,114,675 A | 9/2000 | Wada et al. | |
| 6,399,017 B1 | 6/2002 | Norville et al. | |
| 6,402,367 B1 | 6/2002 | Lu et al. | |
| 6,432,160 B1 | 8/2002 | Norville et al. | |
| 6,443,216 B1 | 9/2002 | Lombard et al. | |
| 6,542,535 B2 | 4/2003 | Fishman et al. | |
| 6,637,927 B2 | 10/2003 | Lu et al. | |
| 6,796,362 B2 | 9/2004 | Lombard et al. | |
| 6,932,938 B2 | 8/2005 | Norville et al. | |
| 6,991,970 B2 | 1/2006 | Fogal et al. | |
| 7,028,746 B2 | 4/2006 | Akers et al. | |

(Continued)

FOREIGN PATENT DOCUMENTS

| | | |
|---|---|---|
| EP | 0069270 B1 | 10/1986 |
| JP | 58-181283 | 10/1983 |

(Continued)

*Primary Examiner* — Jie Yang
(74) *Attorney, Agent, or Firm* — Fay Sharpe LLP

(57) ABSTRACT

A semi-liquid metal processing apparatus and method are presented in which a semi-liquid metal and/or semi-solid metal is introduced into a crucible and his electromagnetically stirred at a first frequency while cooling, and thereafter sidewalls of a metal charge formed of the semi-liquid metal and/or semi-solid metal are partially melted prior to tilting the crucible for removal of the metal charge.

17 Claims, 18 Drawing Sheets

(56) References Cited

U.S. PATENT DOCUMENTS

| | | |
|---|---|---|
| 7,132,077 B2 | 11/2006 | Norville et al. |
| 7,169,350 B2 | 1/2007 | Norville et al. |
| 7,216,690 B2 | 5/2007 | Han et al. |
| 7,457,344 B2 | 11/2008 | Fishman et al. |
| 7,598,632 B2 | 10/2009 | Fishman et al. |
| 8,241,390 B2 * | 8/2012 | Koch .......................... 75/10.15 |
| 2002/0170696 A1 | 11/2002 | Akers et al. |
| 2004/0084171 A1 | 5/2004 | Akers et al. |
| 2005/0167073 A1 | 8/2005 | Hong |
| 2007/0187060 A1 | 8/2007 | Han et al. |
| 2008/0228424 A1 | 9/2008 | Grosser et al. |
| 2010/0251854 A1 | 10/2010 | Koch |

FOREIGN PATENT DOCUMENTS

| | | |
|---|---|---|
| JP | 07-022167 | 1/1995 |
| JP | 07-316611 | 12/1995 |
| JP | 10-140260 | 5/1998 |
| JP | 10-272548 | 10/1998 |
| JP | 11-172402 | 6/1999 |
| JP | 2001-026428 | 1/2001 |
| JP | 2004-230462 | 8/2004 |
| JP | 2005-002394 | 1/2005 |

\* cited by examiner

SECTION A-A

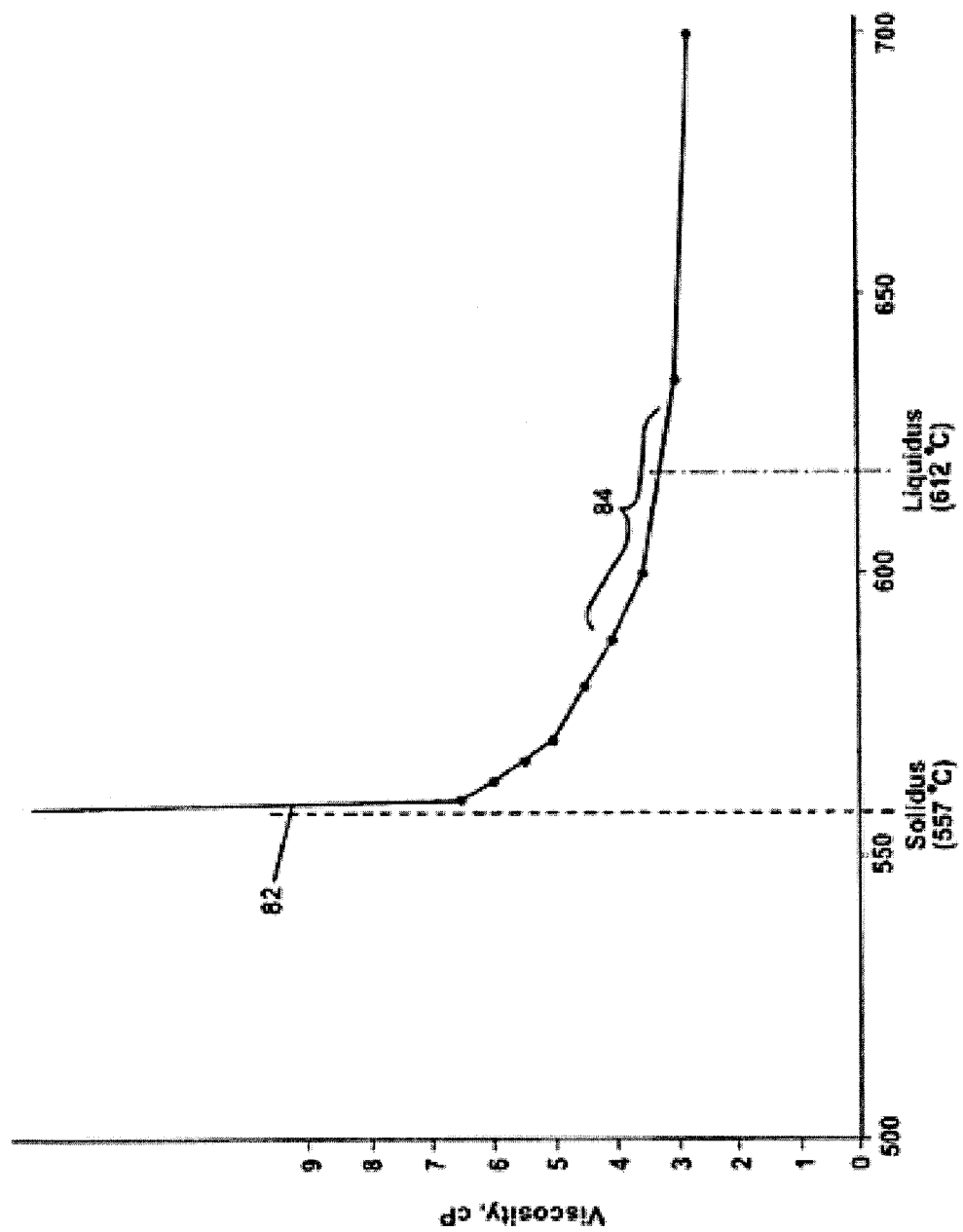

CRUCIBLE AND DUAL FREQUENCY CONTROL METHOD FOR SEMI-LIQUID METAL PROCESSING

REFERENCE TO RELATED APPLICATION

This application claims priority to, and the benefit of, U.S. Provisional Patent Application Ser. No. 61/706,586, filed on Sep. 27, 2012, entitled CRUCIBLE AND DUAL FREQUENCY CONTROL METHOD FOR SEMI LIQUID METAL PROCESSING, the entirety of which application is hereby incorporated by reference.

The present disclosure relates generally to a an improved crucible design and dual frequency methods for processing molten and/or semi-molten metal and may be used in applications which transfer the molten and/or semi-molten material to a forming device.

BACKGROUND

Metal processing and forming is an important industrial process. It is often desirable to form or cast a metal product from a metal that is in a molten state that is not entirely liquid. At the same time, it is desirable to control selected properties of the material, such as viscosity. One known process of controlling the material properties consists of shearing a molten alloy with a stirring apparatus, while at the same time cooling the metal through the semi-solid temperature range of the alloy (i.e., a temperature ranging between the liquidus temperature and the solidus temperature) during which time the material will have a varying solids fraction (fs), but will have a consistency more solid than liquid. The liquidus temperature is the minimum temperature at which all components of a mixture (such as a metal alloy) can be in a liquid state. Below the liquidus temperature, the mixture will be partly or entirely solid. The solidus temperature is the maximum temperature at which all components of a mixture (such as a metal alloy) can be in a solid state. Above the solidus temperature, some or all of the mixture will be in a liquid state.

This type of metal processing results in initiation nucleation in the mixture when the melt temperature of the mixture has dropped below the liquidus temperature, thereby preventing the normally-occurring formation of a dendritic (i.e., needle-like, crystalline structure in the material). During this type of metal processing and when the semi-solid material is at a specific solids fraction, the multi-constituent alloy material has a structure consisting of solid, spheroidal "α-particles" (i.e., solid particles having a higher melting point primary constituent) that are surrounded by a eutectic liquid (i.e., a liquid comprising lower melting point constituents). As such, during the processing of the mixture, the semi-solid material, hereinafter referred to as "SSM," has a viscosity which enables the mixture to be handled as a semi-rigid mass. Such semi-rigid mass of the mixture can be injected into a mold under conditions of laminar flow, unlike the turbulent flow usually characterizing a conventional fully molten alloy forming and injection process.

Injecting SSM into a mold under laminar flow can eliminate many common defects associated with a conventional molten metal process for producing die castings, permanent mold castings and other casting methods. These defects include shrinkage porosity, formation of oxides, and gas porosity. Each of these defects can cause reduced mechanical properties of the formed mixture, such as lowered strength, reduced fatigue life, and/or reduced ability of the castings to satisfactorily be heat treated, which is typically employed to optimize strength and elongation of the casted product.

Another beneficial feature of a process that includes the shearing of a molten alloy is that after processing the SSM, the material can be allowed to fully solidify, and upon subsequent re-heating, the material retains the spheroidal "α-particle" SSM structure throughout its semi-solid temperature range. This latter reheating process has been a common and preferred practice due to the ability to create metal stock having the SSM structure through a high-volume bar casting operation. The bars can be readily shipped to a production facility, cut to a selected size, and then re-heated to a semi-solid condition in preparation for a forming or casting operation. However, this process is expensive due to costs associated with equipment used for reheating the SSM and casting the processed bar stock, as well as the inability to recycle processed material and scrap on-site while retaining the SSM structure.

Melting, cooling, and processing of SSM material on-site from standard raw metal stock can result in economies in both equipment and material recycling compared to the reheating process, in large part because expensive re-heating equipment is not required, and large quantities of material are not maintained in process-material that can be rendered unusable if an interruption of the heating or forming process should occur. This standard metal production process is performed with standard furnaces and molten metal transfer equipment. Scrapped metal can be readily recycled and reprocessed into an SSM condition on-site, as needed. Some cost is incurred for an on-site processing unit, but this is typically significantly less than the total cost of all the specialized equipment needed for the reheating process.

In both the reheating process and a conventional production process, the goal is to create a selected microstructure in the finished metal. A significant benefit of the SSM process and subsequent forming of the material into finished products is the ability for the viscous SSM material to flow in a laminar fashion into a mold, which minimizes the occurrence of defects.

Benefits from this process include improved mechanical properties and fatigue life, based on the minimization of oxides, gas porosity and shrinkage porosity. Safety-critical and pressure-sensitive components are prime candidates for these SSM forming processes.

Conventionally, the desired SSM condition is determined by the temperature of the molten metal charge using a thermocouple. The thermocouple is either immersed in the material, or embedded in the container holding the material. An alternate method is to retrieve a sample of material, and cut or knead the material with a spatula to get a "feel" for the viscosity. However, such alternate methods are imprecise, destructive, and involve a separate process step that is not "in line" with the essential melting and casting process. The thermocouple has limitations because it is effectively sacrificial, and can degrade, erode, or become fouled during use.

Other methods of process control are performed on a time basis, programmed via an algorithm that takes into account only the initial molten metal temperature through thermocouple sensing, and the known thermal characteristics of the metal alloy. This control method is unreliable since it does not take into account all variables, such as container temperatures and ambient temperatures. Existing methods also do not enable continuous monitoring of the condition of the SSM material throughout the charging, processing, delivery or transfer steps of the forming process.

A semi-liquid material, hereinafter referred to as "SLM," also has a temperature ranging between the liquidus temperature and the solidus temperature, but with a consistency more liquid than solid. SLM is also utilized for forming and casting operations. Existing SLM methods also suffer from limitations. Such methods do not account for irregular forming cycle times caused by downstream machine interruptions, operator interruptions, or short-term maintenance interruptions. If a standard cooling cycle is delayed or interrupted, the SLM charge must be scrapped, and another metal charge must be processed when the machine interruption has been resolved. This can result in wasted material, and with attendant increased costs. Also, existing SLM methods are unable to control the SLM process in a manner that ensures that the temperature and viscosity conditions of the SLM charge are consistently the same for each metal charge.

In view of the current state of the art, there is a need for an apparatus and method that overcomes the past deficiencies associated with processing SSM/SLM. In particular, there is a need for an apparatus and method that can be used to control the SSM/SLM process in a manner that ensures that the temperature and/or viscosity conditions of the SSM/SLM charge are consistently the same for each metal charge, and which apparatus and method allows for continuous monitoring of the condition of the SSM/SLM material throughout the charging, processing, and delivery or transfer steps of a forming process.

SUMMARY

The present disclosure is directed to a semi-liquid metal (SLM) and/or semi-solid metal (SSM) processing and sensing device that overcomes the past deficiencies associated with processing SSM/SLM. As used herein, the terms SSM and SLM will be used interchangeably, and both refer to a metal or metal alloy that is at a temperature ranging between the liquidus temperature and the solidus temperature of the metal or metal alloy.

Methods and apparatus are disclosed for processing a semi-liquid and/or semi-solid metal, in which the metal is introduced into a crucible that is at least partially encircled by at least one induction coil and is held therein while regulating the crucible temperature by controlling the provision of power to the induction coil. The SSM/SLM is cooled and stirred in the crucible by providing AC power to the induction coil at a first frequency and is thereafter held in the crucible while powering the induction coil at a higher frequency to at least partially melt a portion of a metal charge formed of the SSM/SLM in the crucible proximate to at least one sidewall of the crucible, after which the crucible is tiled for removal of the metal charge. In certain embodiments, the first frequency is about 3 kHz or more and about 5 kHz or less, such as about 3.4 kHz in one example, and the second frequency is about 6-10 kHz, for instance, about 7.3 kHz in one example. In certain embodiments, moreover, the SSM/SLM material is held for about 20 seconds in the crucible while powering the induction coil at the second frequency prior to tilting the crucible to remove the metal charge.

A slurry on demand crucible apparatus is disclosed for receiving molten metal or metal alloy and 4 dispensing a metal charge in a multi-cycle process to provide metal charges to a forming machine. The crucible apparatus includes a crucible structure with a bottom and at least one sidewall defining an interior as well as an open top for receiving molten metal or metal alloy. The apparatus further includes at least one induction coil that wholly or partially encircles a portion of the crucible, as well as a thermally conductive susceptor structure close to or abutting the crucible bottom, where the susceptor structure includes one or more passageways and a plurality of ports in fluidic communication with the passageway(s) to allow passage of gas or liquid through the passageway to facilitate heat removal from the bottom of the crucible.

BRIEF DESCRIPTION OF THE DRAWINGS

Reference may now be made to the drawings, which illustrate various embodiments that the disclosure may take in physical form and in certain parts and arrangements of parts wherein;

FIG. 6 is a prior art representation of a exemplary viscosity vs. temperature curve for a metal alloy charge comprising an A356 grade aluminum alloy having about 7% silicon;

DETAILED DESCRIPTION

Referring now in greater detail to the drawings, wherein the showings are for the purpose of illustrating various embodiments of the disclosure only, and not for the purpose of limiting the disclosure, the present disclosure is directed to a SML/SSM processing and sensing device, hereinafter also referred to as a "generator," for preparing SML/SSM for use in metal forming or casting operations. In general, the process includes cooling the metal charge to the liquid, molten metal temperature of the metal charge after the metal charge has been inserted into the generator, then further cooling the metal charge in a controlled manner with electromagnetic stirring and/or other types of stirring in order to minimize the formation of a dendritic crystalline structure, and/or to facilitate the formation or nucleation of a spheroid α-particle structure in the metal charge. The rate of cooling, and the condition of the molten metal charge below the liquidus temperature can be at least partially determined by measuring the heat content of the molten metal charge. In accordance with one non-limiting aspect of the present disclosure, the heat content of the molten metal and/or SML/SSM in the generator can be at least partially determined indirectly by determining the electrical resistivity of the molten metal charge and/or SML/SSM in the generator by measuring the changing voltage, current, resistance, and/or power that is reflected in the feedback of the heating/cooling coil as the condition and temperature of the molten metal charge and/or SML/SSM changes in the generator. In accordance with another non-limiting aspect of the present disclosure, the molten metal charge and/or SML/SSM in the generator can be agitated by exposing the molten metal charge and/or SML/SSM to an alternating magnetic field. In accordance with still another non-limiting aspect of the present disclosure, the SML/SSM in the generator can be maintained within a desired temperature range and/or maintained to have desired physical properties up to the point of delivery of the SML/SSM to a forming or casting apparatus.

Figure 1:
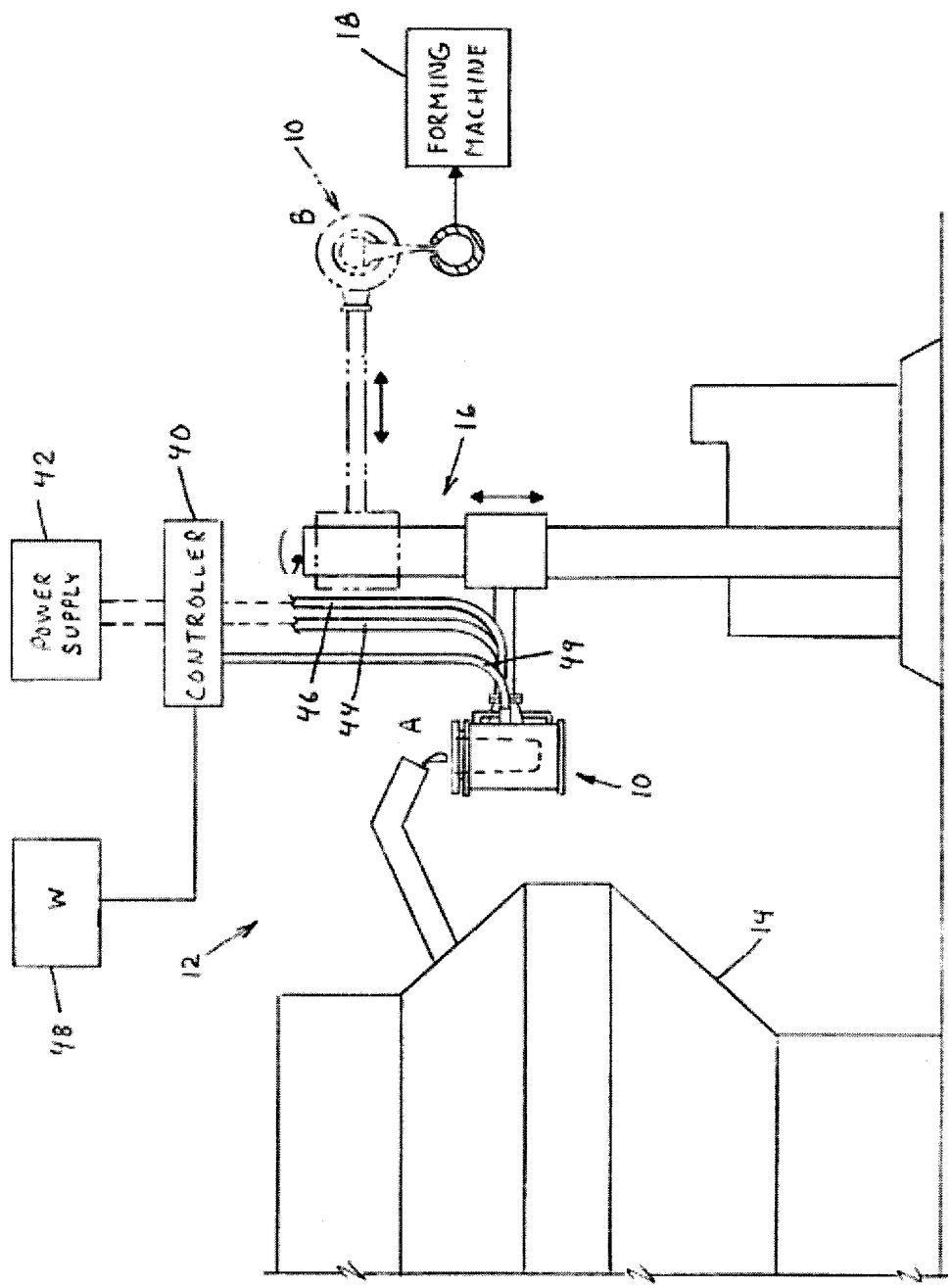
FIG. 1 is a schematic representation of a non-limiting metal casting assembly comprising a semi-liquid metal processing and sensing device according to the present disclosure.

Referring to FIG. 1, a generator 10 according to the present disclosure is illustrated. Generator 10 comprises part of a metal casting assembly 12 comprising a known furnace 14 (e.g., dosing furnace, etc.) to supply molten metal. As illustrated in FIG. 1, the motel metal is supplied to generator 10 by use of a robotic arm assembly 16. As can be appreciated, the molten metal can be supplied to the generator by other or alternative means such as, but not limited to, an automatic ladling transfer device, a device to tilt generator 10 to pour out the SLM/SSM charge, and/or a known forming or casting apparatus to accept the SLM/SSM charge. The use and type of a furnace to melt a metal charge is well known in the art, thus will not be described in detail herein. Likewise, the formation of a metal charge in a forming or casting apparatus is well known in the art, thus will also not be described in detail herein. Non-limiting types of processing devices that include the use of a furnace and forming or casting apparatus that can be used in the present disclosure are disclosed in U.S. Pat. Nos. 7,169,350; 6,991,970; and 6,432,160, all of which are incorporated herein by reference.

Figure 2A:
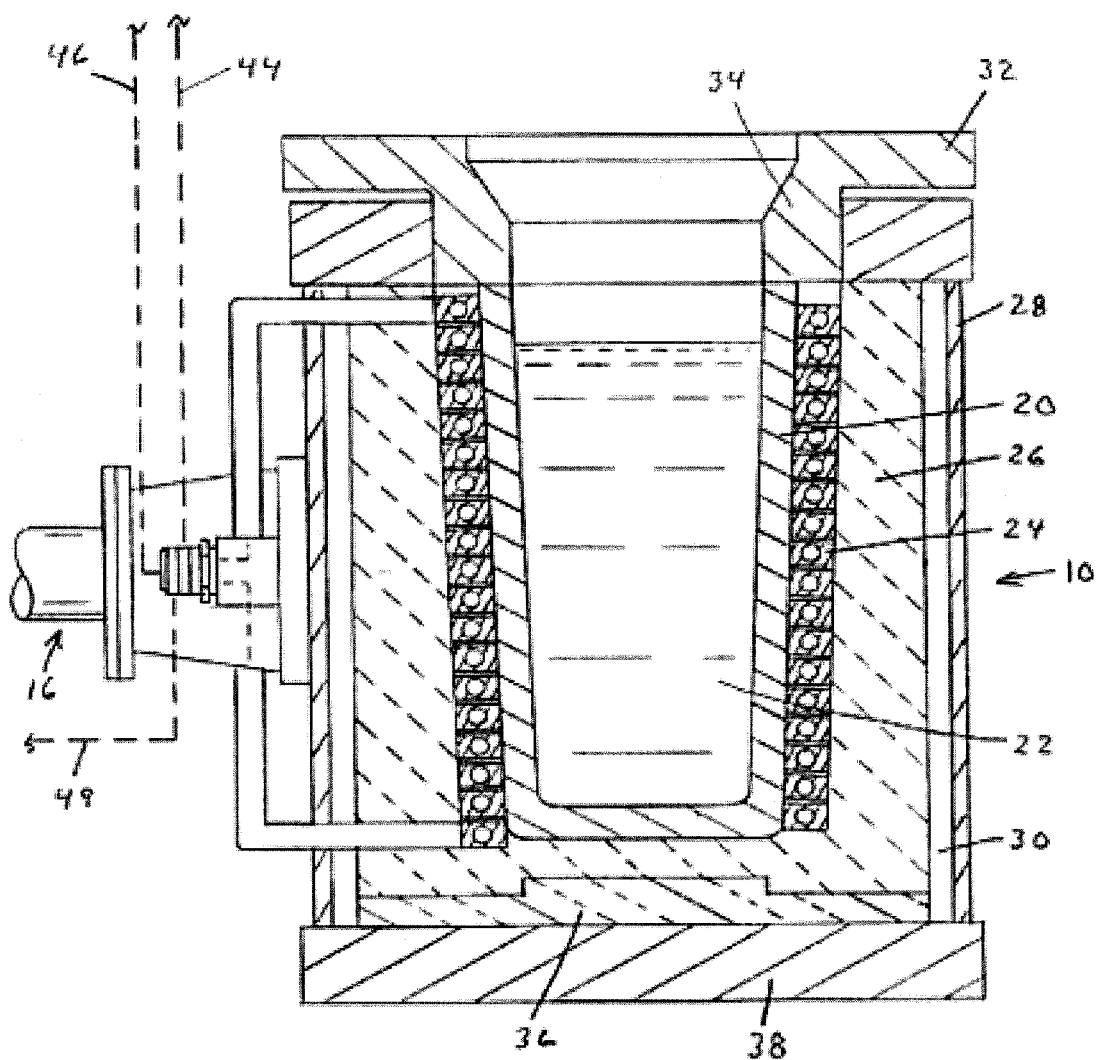
FIG. 2A is a schematic representation of the non-limiting semi-liquid metal processing and sensing device illustrated in FIG. 1, illustrated as a sectional view.
Figure 2B:
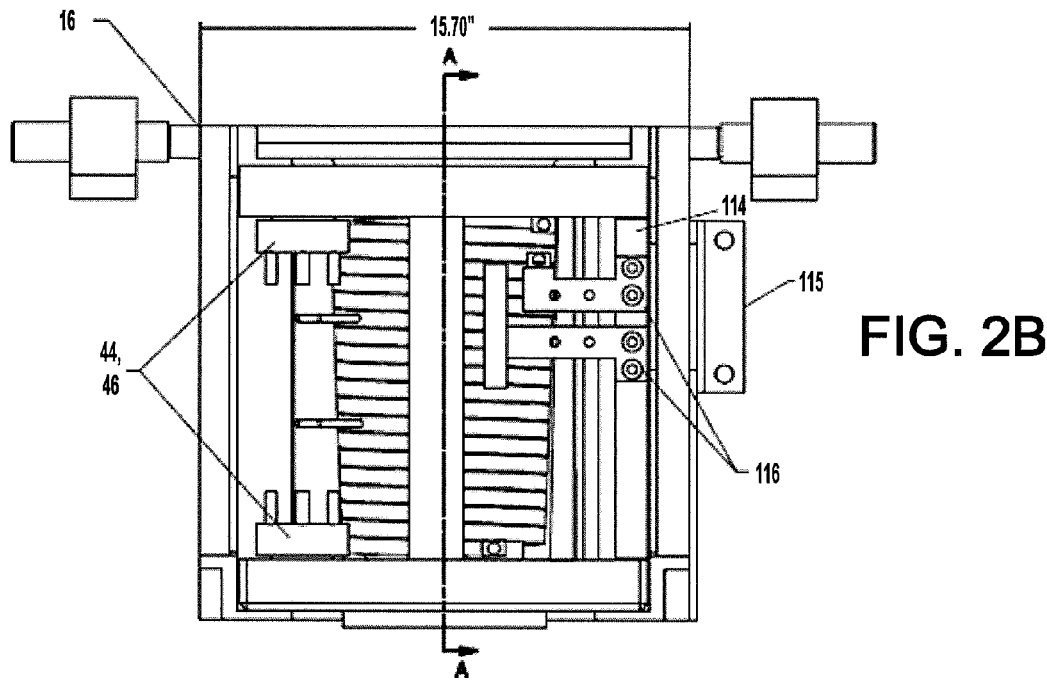
FIG. 2B is a side elevation view illustrating another exemplary crucible.
Figure 2C:
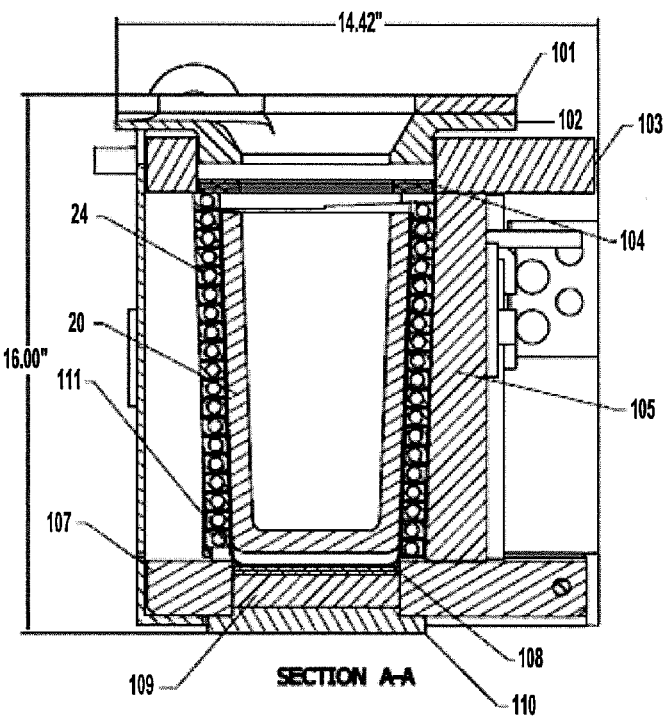
FIG. 2C is a partial sectional side elevation view further illustrating the crucible of FIG. 2B with a susceptor structure positioned proximate the bottom end of the crucible.

Referring to FIGS. 2A-2H, generator 10 is illustrated, comprising an open-topped crucible 20 adapted to hold a metal charge 22 of molten metal and/or SML/SSM such as, but not limited to, aluminum or an aluminum alloy. The crucible has a cavity having a generally circular cross-sectional shape; however, it can be appreciated that other cross-section shapes can be used. The outer shape of the crucible also has a generally circular cross-sectional shape; however, it can be appreciated that other cross-section shapes can be used. The cross-sectional area of the crucible cavity and/or outer shape can be constant or variable. As illustrated in FIGS. 2A and 2C, the cross-sectional area of the crucible cavity and the outer shape is tapered, thus varies over the length of the crucible. The tapered cavity of the crucible has the advantages of enabling easier cleaning of the cavity and easier removal of the metal charge in the cavity. The tapered outer shape of the crucible has the advantage of making the crucible easier to replace in the generator. As can be appreciated, the crucible can have other shapes. The present disclosure will be described herein with respect to an exemplary aluminum alloy charge, although the disclosure is also suitable for processing other molten materials such as, but not limited to, ferrous and non-ferrous alloys, precious metals, and the like.

Crucible 20 is generally fabricated of a material having suitable strength, durability, and thermal properties for the temperatures and metal charge mass to which the crucible 20 will be exposed. Suitable materials can include, but are not limited to, graphite, known ceramic or refractory materials, or a combination of metal and graphite or ceramic materials. The open end of the crucible 20 can be circumscribed by an annular top flange 32 transitioning to the crucible 20 through an annular refractory cap 34; however, this is not required. The annular top flange can be provided with a means to close the crucible opening for the purpose of introducing an inert gas (i.e., nitrogen and/or argon, etc.) so as to inhibit or reduce the formation of oxides in the SLM/SSM material; however, this is not required.

Extending circumferentially around the crucible 20 is a generally well-known solenoid induction coil 24. As can be appreciated, more than one coil can extend at least partially around the crucible. In one non-limiting embodiment, induction coil 24 is cooled internally with a coolant such as, but not limited to, water. As can be appreciated, induction coil 24 can be designed to not be cooled by an internally flowing coolant. As can also be appreciated, one or more cooling coils can be positioned about the crucible so as to cool the crucible in one or more zones and/or one or more heating coils can be positioned about the crucible to heat the crucible in one or more zones; however, this is not required. Induction coil 24 can include a pair of cooling fluid leads 44, 46.

Figure 2D:
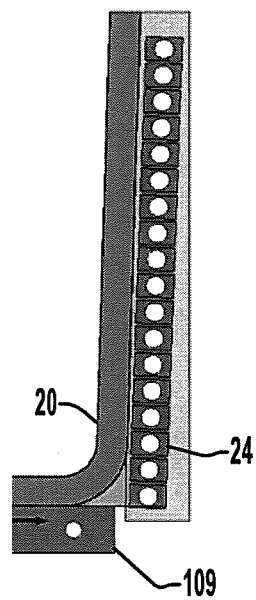
FIG. 2D is a partial sectional view of the crucible of FIGS. 2A and 2B illustrating another implementation with the susceptor abutting the bottom end of the crucible.
Figure 2E:
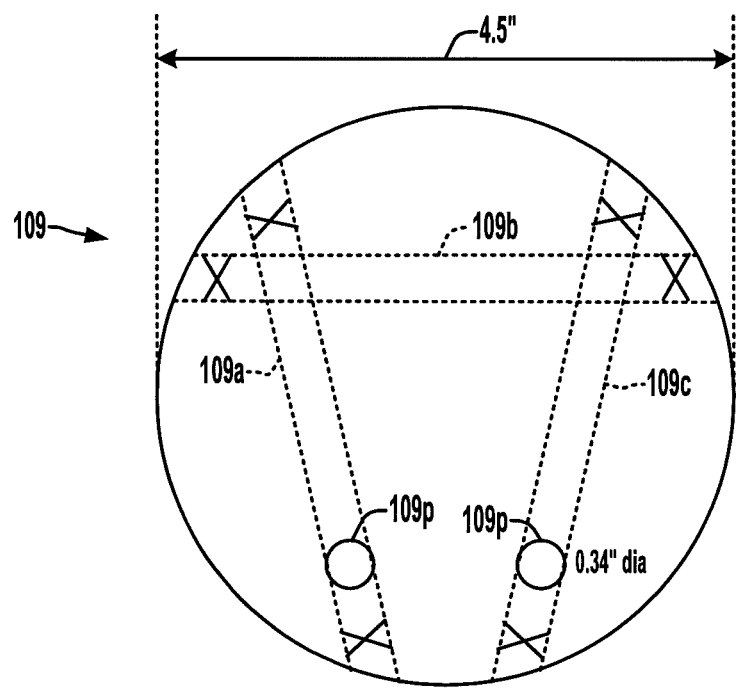
FIG. 2E is a top plan view illustrating an exemplary susceptor with internal passageways for air or water cooling.
Figure 2F:
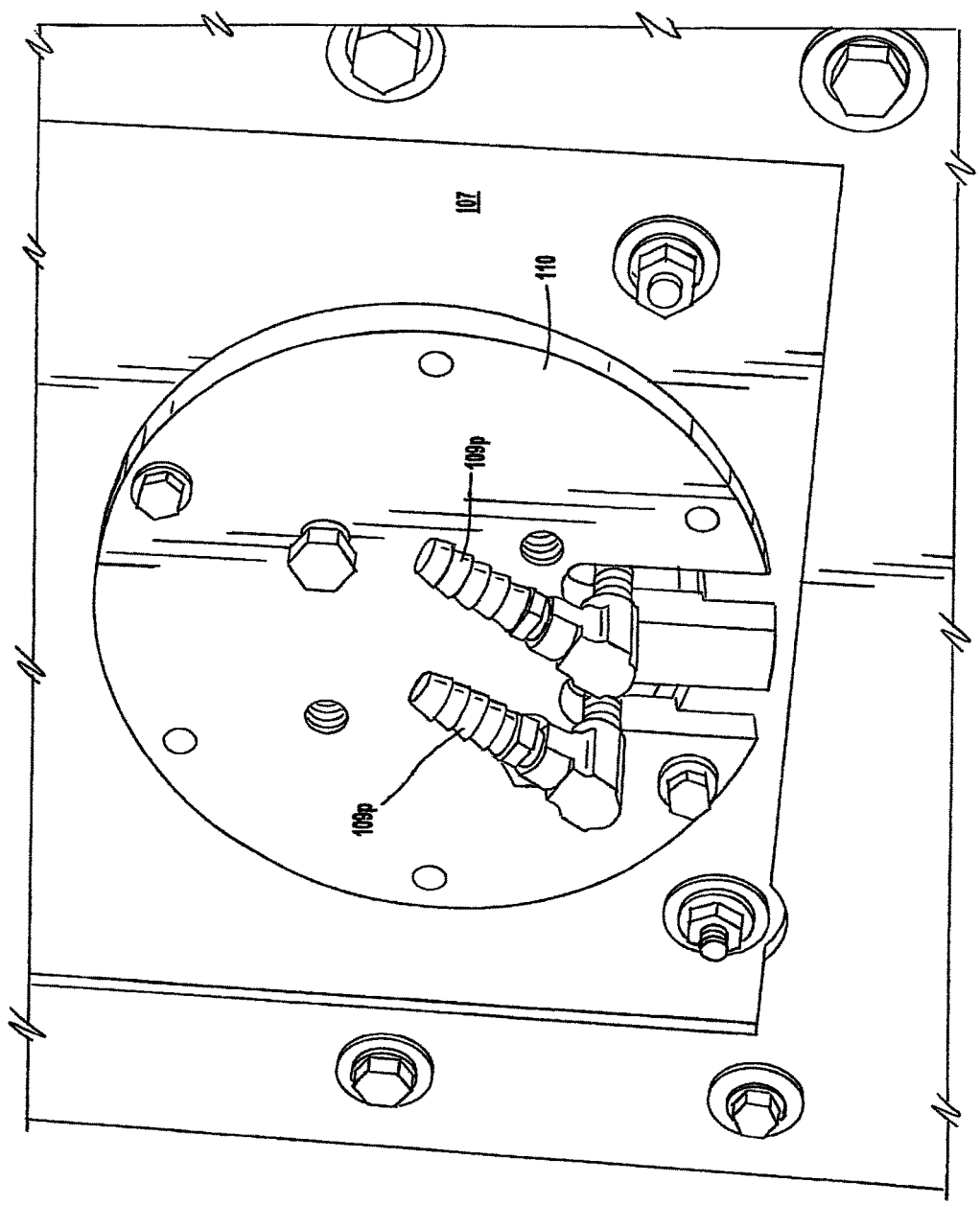
FIG. 2F is a bottom perspective view illustrating the crucible of FIGS. 2A-2E with coolant ports in fluidic coupling with the passageways of the susceptor.
Figure 2G:
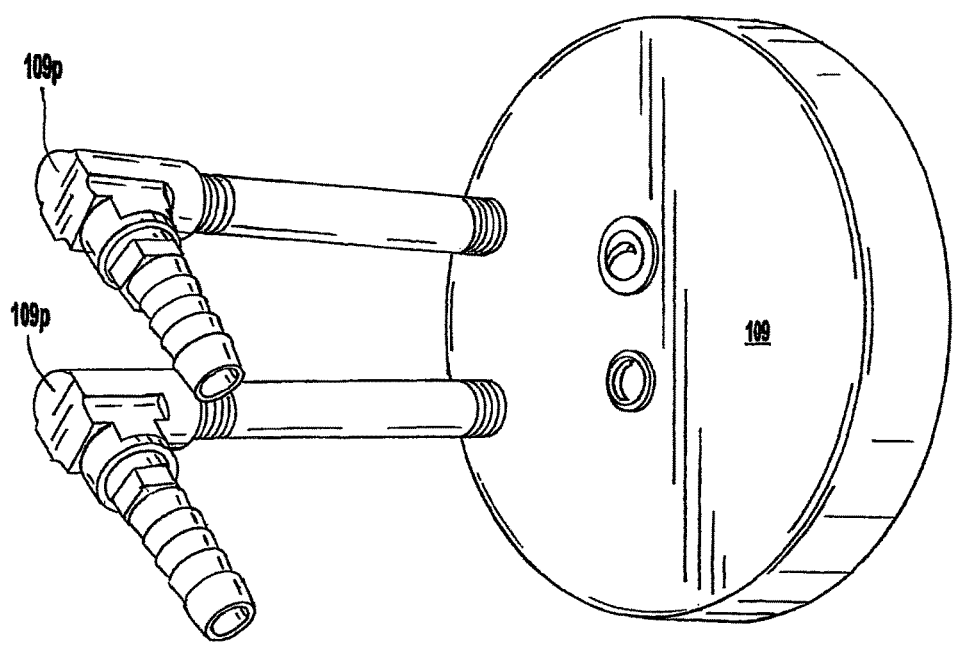
FIG. 2G is a perspective view illustrating an exemplary susceptor with externally accessible coolant ports.
Figure 2H:
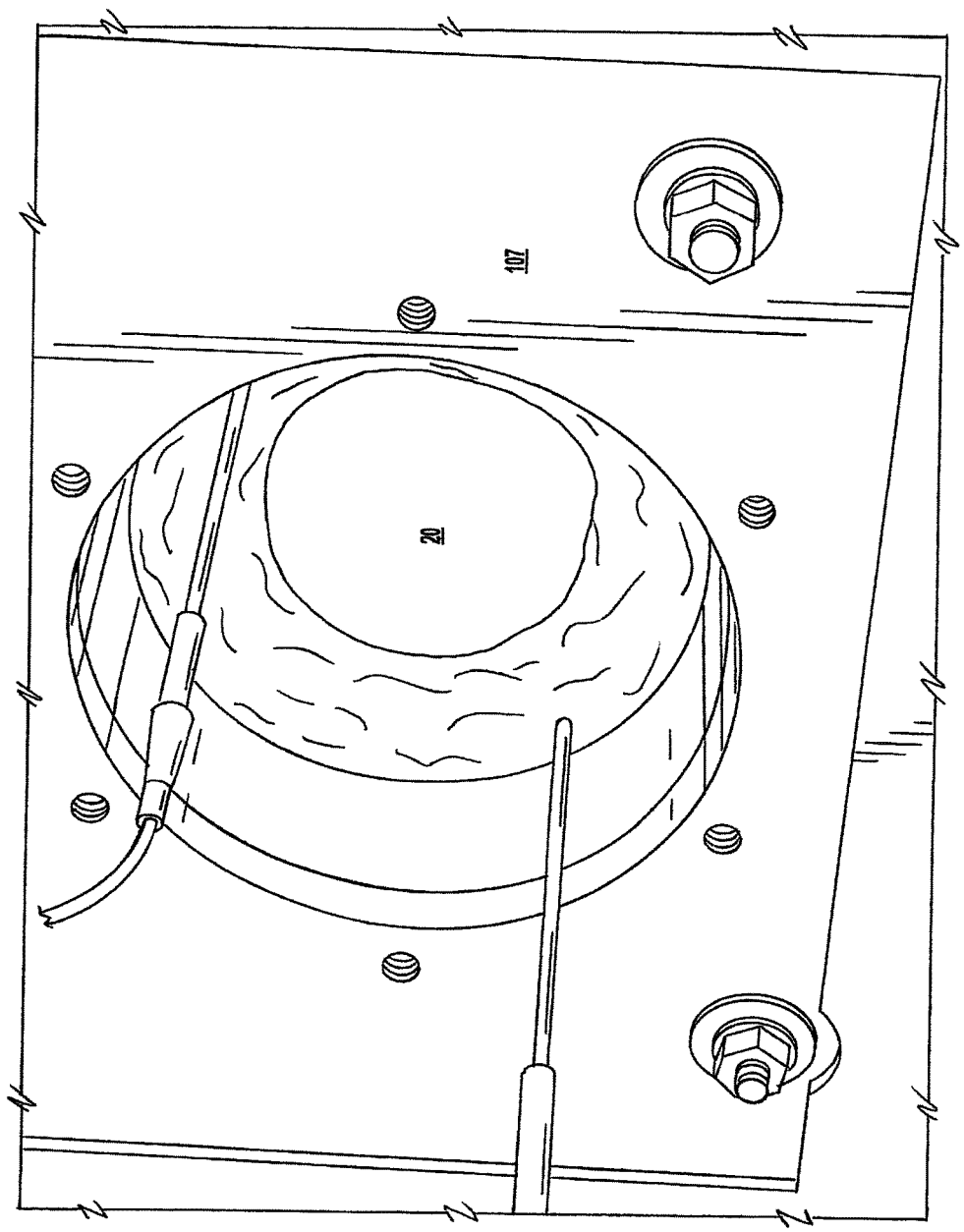
FIG. 2H is a bottom perspective view showing the crucible assembly with the susceptor removed.

FIGS. 2B-2H illustrate alternative embodiments of the crucible 20, which include a splash board 101 (FIG. 2C, e.g., half-inch thick NAD 11 material with a 12" diameter) with a spout cap 102 (e.g., 1.5" thick Maronite A material, 12 inch diameter) and a top plate 103 (1.65 inch thick NAD 11 material, 14"×14"), along with one or more high temperature pressure rings (e.g., 8" diameter, 0.25" thick) and one or more wood or ceramic laminated stub boards 105. The embodiment of FIGS. 2A and 2B also includes a crucible shell 111 (e.g., CWP 366Off fill (Allied Materials)) and a 1.625" thick 14"×14" NAD 11 bottom plate 107, along with a copper or Maronite A cooling puck or susceptor 109, which in the illustrated embodiment has a diameter of 5" and a thickness of approximately 1". The cooling susceptor 109 is positioned proximate the bottom of the crucible 20, where the example of FIG. 2C includes one or more fiberfrax disks are other insulating material, such as a pair of ⅛" sheet cutouts disposed between the bottom surface of the crucible 20 and the cooling susceptor 109, although other embodiments are contemplated in which the cooling susceptor 109 directly abuts the bottom surface of the crucible 20, as seen in FIG. 2D. In one preferred implementation, the bottom of the crucible 20 and/or the top of the susceptor 109 is/are coated with boron nitride as a heat transfer medium to facilitate heat transfer between the susceptor puck 109 and the crucible bottom. As shown in FIG. 2G, moreover, bronze screws may be used to hold the susceptor 109 in place by compression to the bottom of the crucible 20, and one or more ceramic material pieces may be used to maintain the puck centered and firmly in place in contact with the bottom of the crucible.

As seen in FIG. 2C, moreover, a bottom plate 110 is provided in certain embodiments (e.g., 6.5" diameter 0.75" thick NAD 11 material) to close a passageway (e.g., FIG. 2H) provided for installation of the cooling susceptor 109, where the susceptor 109 may be bolted to the bottom of the crucible 20 as seen in FIG. 2G. The embodiment of FIGS. 2A-2C also includes copper water manifolds 44, 46, as well as post structures 114 (e.g., G-10 phenolic), a red plastic lead clamp 115 and copper flag structures 16 (FIG. 2A).

As seen in FIG. 2E, moreover, certain embodiments of the cooling susceptor or puck structure 109 may include one or more passageways 109a, 109b, and 109c providing a passageway configuration allowing air and/or water coolant to be used to extract heat from the susceptor structure 109. The illustrated example includes three such passageways drilled laterally into a center of the copper susceptor structure 109, where the illustrated passageways have a 0.34" diameter. After drilling, the ends of the passageways 109a, 109b and 109c are plugged using any suitable material (plugs indicated as "X" in the drawing), and two 0.34" diameter access ports 109p are drilled into the bottom of the susceptor structure 109. As further seen in FIGS. 2F and 2G, the port structures include NPT ports allowing connection to a cooling fluid supply, which can be water or pressurized air in certain embodiments. In other embodiments, the NPT ports are unconnected allowing convection circulation of air through the passageways 109a-109c. In operation, the susceptor structure 109 provide heat sinking via the bottom of the crucible structure 20, and the susceptor 1B directly abutting the bottom surface of the crucible 20 (FIG. 2D) or one or more intervening structures may be interposed therebetween, such as the discs 108 shown in the embodiment of FIG. 2C. In the illustrated example, the cooling susceptor structure 109 is a 1" thick, 5" diameter copper structure, although other materials may be used, including without limitation Maronite A or any other material that facilitates removal of heat from the lower end of the crucible 20, whether using cooling passageways or without passageways.

In one non-limiting embodiment, the induction coil cooling fluid leads 44, 46 can include a heavy-duty hose or tubing encasing a copper cable such as used in welding equipment; however, it can be appreciated that cooling fluid leads 44, 46 can be formed in other ways. The tubing, when used for cooling fluid leads 44, 46, can comprise copper tubing; however, this is not required. The cooling fluid can be water W or some other type of cooling fluid. As illustrated in FIG. 1, a cooling fluid reservoir 48 can be used to maintain the desired amount a cooling fluid flowing through cooling fluid leads 44, 46. A tube 49 can be used to supply cooling fluid from cooling fluid reservoir 48 to the cooling fluid leads 44, 46 or induction coil about the crucible so as to maintain a desired amount of cooling fluid circulation through the induction coil and the cooling fluid leads 44, 46. The cooling fluid leads 44, 46, when used, can be couple or connected to a power supply 42 to enable current to be supplied to coil 24; however, this is not required. The power supply current through the leads 44, 46 and the induction coil 24 is alternated at one or more desired frequencies to produce a magnetic field. Typically, the desired frequencies of the alternating current is a high frequency (e.g., at least about 10 Hz); however, this is not required. The magnetic field created by the alternating current has an effect of heating the metal charge 22 in the crucible 20. Coolant can be used to circulate through induction coil 24 to maintain coil 24 at a selected temperature while the alternating magnetic field heats the metal charge 22; however, this is not required.

In another non-limiting embodiment, induction coil 24 is spaced from crucible 20. When induction heating coil is spaced from crucible 20, the spacing is generally uniform; however, this is not required. Furthermore, when induction heating coil is spaced from crucible 20, the spacing is generally at least about 0.01 inch, typically at least about 0.02 include, more typically less than about 10 inches, still more typically about 0.05-5 inches, and yet more typically about 0.1-1 inch. Induction coil 24 can be spaced at a uniform distance from the crucible perimeter with refractory spacers, which facilitate centering of the crucible 20 within the coil 24; however, this is not required.

In another non-limiting embodiment, the height of induction coil 24 can be selected to encircle the entire crucible 20, at least partially encircle the crucible, and/or extend beyond the top and/or bottom of crucible 20. Typically, the height of induction coil 24 is selected to encircle the entire crucible 20 so that uniform heating of the metal charge in the crucible can be achieved. The height of induction coil 24 can be selected to not only encircle the entire crucible 20, but to also extend above the top and/or below the bottom of the crucible; however, this is not required. When the height of induction coil 24 extends above the top and/or below the bottom of the crucible, the top and bottom extensions can either or both be up to one third the crucible height above the top and/or bottom of the crucible. For example, for a six inch crucible height, induction coil 24 can extend up to two inches above the top of the crucible and/or up to two inches below the bottom of the crucible; however, it can be appreciated that the induction coil 24 can be more than a third of the crucible height above and/or below the crucible. The extension of the induction coil above the top and/or below the bottom of the crucible facilitates in achieving even heating and/or agitation of metal charge 22 at both the bottom and top of crucible 20.

Induction coil 24 can be at least partially encased within a coupling material 26, which material 26 contacts the circumferential perimeter of crucible 20. As illustrated in FIG. 2, coupling material 26 can also contact the bottom of crucible 20; however, this is not required. The coupling material, when used, can comprise a rammed or compacted dry refractory material, mica paper, a cast-in-place refractory-type cement, or some other refractory-type material suitable for providing thermal coupling of induction coil 24 with the crucible 20. As can be appreciated, other or additional materials can be used for coupling material 26. The thermal coupling created by coupling material 26 enables concurrent heat flow from crucible 20 to the water-cooled induction coil 24 and/or another coiling coil when used, and to the heating of the crucible 20 and the molten metal charge 22 by the induction field generated by induction coil 24. As such, coolant flowing through the induction coil 24 and/or other cooling coils can be used to provide cooling of crucible 20 and metal charge 22 through the thermal coupling of coil 24 and/or other cooling coils, coupling material 26, and crucible 20. In one arrangement, the solenoid induction coil 24 can be used for both cooling and heating, thus can be used to provide a means of quickly controlling the temperature, viscosity, and solids fraction (fs) of metal charge 22 in crucible 20.

The crucible 20 and induction coil 24 can be at least partially enclosed within a housing comprising a protective, electrically non-conductive outer shell 28. The housing, when used, can include an intermediate assembly 30 of phenolic spacers and structure boards; however, this is not required. Along the closed end or bottom of crucible 20, a coupling material 26 can be provided with an insulating layer 36, and an end cap 38 can be configured to extend over the closed end in contact with outer shell 28; however, this is not required.

Referring again to FIGS. 1 and 2A, induction coil 24 is electrically coupled or connected to a variable-frequency power supply 42 such as, but not limited to, a 150 kilowatt, a 480 volt, 3-phase AC input power supply. In one non-limiting embodiment, a range of output frequencies of the AC input power supply that can be utilized is 10-10,000 Hz. The power supply can be adapted to operate at a selected frequency, or in a simultaneous, multiple-frequency mode, to enhance agitation and/or stirring for homogeneity and/or to better control of the heating and cooling process. For example, a particular frequency can be selected where the cooling rate of the material is the primary parameter, with a secondary parameter being the agitation of the material to achieve a selected homogeneity. As can be appreciated, other or additional parameters can be used to select the one or more frequencies generated by the AC input power supply.

The alternating current in induction coil 24 sets up an electromagnetic field that creates a circulating current in metal charge 22. The alternating current flow in the coil generates or induces an opposite current flow in the conducting metal charge, and depending on the resistivity of the metal charge, causes the metal charge to heat at a faster or slower heating rate. As an example, for a metal charge comprising 20 pounds of aluminum, approximately 25 kW of power will be sufficient to maintain the aluminum in a molten state. In one non-limiting arrangement, the 3-phase AC input power can be converted to a DC voltage, and then inverted to a single phase AC power at a selected frequency; however, this is not required. The choice of a variable-frequency induction power supply enables the frequency to be tailored to facilitate in matching the load. Lower frequencies exert a higher electromotive repulsive force on the metal charge in the crucible.

The induction power supply 42 can be controlled by a controller 40 comprising a known closed-loop feedback system based upon voltage, power phase, and/or current feedback; however, this is not required. The closed-loop feedback system, when used, can be utilized to maintain the metal charge 22 at a predetermined heat content, fs, and/or viscosity, or a predetermined cooling rate during processing. In one non-limiting embodiment, the control of the system can be based on changes in the phase angle of the voltage and current from the induction coil. Since the phase angle is independent of the magnitude of the current and the voltage, it can provide a reliable signal even when the power is being modulated up or down in order to meet a heating and/or cooling profile or ramp.

The induction coil 24 can be instrumented with one or more sensors (not shown). These one or more sensors are typically not connected to the induction power supply. The one or more sensors can be designed to monitor one or more electrical parameters such as, but not limited to, current, voltage, power consumption, and/or frequency. From the output of the one or more sensors, particularly voltage, current, the true power load resistance on the induction coil, and/or the resistivity of the metal charge can be determined through mathematical relationships. These calculations can be performed by formulas programmed into a PLC or other type of device, which in turn is used to control the overall heating and cooling process. The ability to sense the condition of the molten charge from the feedback sensed from the induction coil eliminates the need for the typical, sacrificial thermocouples that are used to control most prior art metal working and casting processes.

The following Table 1 sets forth the grades and associated constituents for selected commercially-available alloys of aluminum. As Table 1 indicates, the constituent proportions can vary between grades and within a selected grade, including the proportions of aluminum. These variations will affect the properties of the SLM/SSM, including the liquidus temperature, the solidus temperature, the viscosity at selected temperatures, the electrical resistivity at selected temperatures, the solids fraction at selected temperatures, and the heat content at selected temperatures.

TABLE 1

Composition of Selected Aluminum Alloy Grades

| | Grade | | | | | | | |
|---|---|---|---|---|---|---|---|---|
| | 332.0 | A413.0 | 319.0 | A356.0 | A357.2 | A360.1 | 384.0 | 7050 |
| Detailed Composition | | | | | | | | |
| Silicon, % | 8.5-10.5 | 11-13 | 5.5-6.5 | 6.5-7.5 | 6.5-7.5 | 9-10 | 10.5-12 | 0.12 |
| Iron, % | 1.2 | 1.2 | 1 | 0.2 | 0.12 | 1.3 | 1 | 0.15 |
| Copper, % | 2-4 | 0.6 | 3-4 | 0.1 | 0.1 | 0.6 | 3-4.5 | 2-2.6 |
| Manganese, % | 0.5 | 0.35 | 0.5 | 0.1 | 0.05 | 0.35 | 0.5 | 0.1 |
| Magnesium, % | 0.5-1.5 | 0.1 | 0.1 | 0.2-0.45- | 0.45-0.7 | 0.45-0.6 | 0.1 | 1.9-2.6 |
| Nickel, % | 0.5 | 2-3 | — | — | — | 0.5 | 0.5 | 1.9-2.6 |
| Zinc, % | 1 | 0.5 | 1 | 0.1 | 0.05 | 0.4 | 3 | 0.08-0.15 |
| Tin, % | — | — | — | — | — | 0.15 | 0.35 | — |
| Titanium, % | 0.25 | 0.25 | 0.25 | 0.25 | 0.04-0.2 | — | — | 0.06 |

TABLE 1-continued

Composition of Selected Aluminum Alloy Grades

| | Grade | | | | | | | |
|---|---|---|---|---|---|---|---|---|
| | 332.0 | A413.0 | 319.0 | A356.0 | A357.2 | A360.1 | 384.0 | 7050 |
| Other Constituents, % | 0.5 | — | 0.5 | 0.15 | 0.1 | 0.25 | 0.5 | 0.15 |
| Aluminum, % | bal. | bal. | bal. | bal. | bal. | bal. | bal. | bal. |

Generator 10 can be designed to control the cooling of metal charge 22 that has been heated to at least the liquidus temperature until the molten metal charge reaches a selected SLM/SSM state, and can then be delivered to a forming apparatus for fabrication of a selected product. The cooling of the metal charge can be at least partially controlled by monitoring the resistivity behavior of the metal charge. This type of control is based on the principles that a) resistivity of the metal charge varies with the heat content and/or temperature of the metal charge, b) the heat content and/or temperature of the metal charge controls the solids fraction of the metal charge, and c) the solids fraction of the metal charge correlates to the viscosity of the metal charge. Ultimately, it is desired to prepare a SLM/SSM charge having a selected viscosity for a selected forming operation. The selected viscosity can be identified by the resistivity behavior of the metal charge as a consequence of the interrelationship of resistivity, heat content, solids fraction, and/or viscosity for a selected metal charge.

Figure 3:
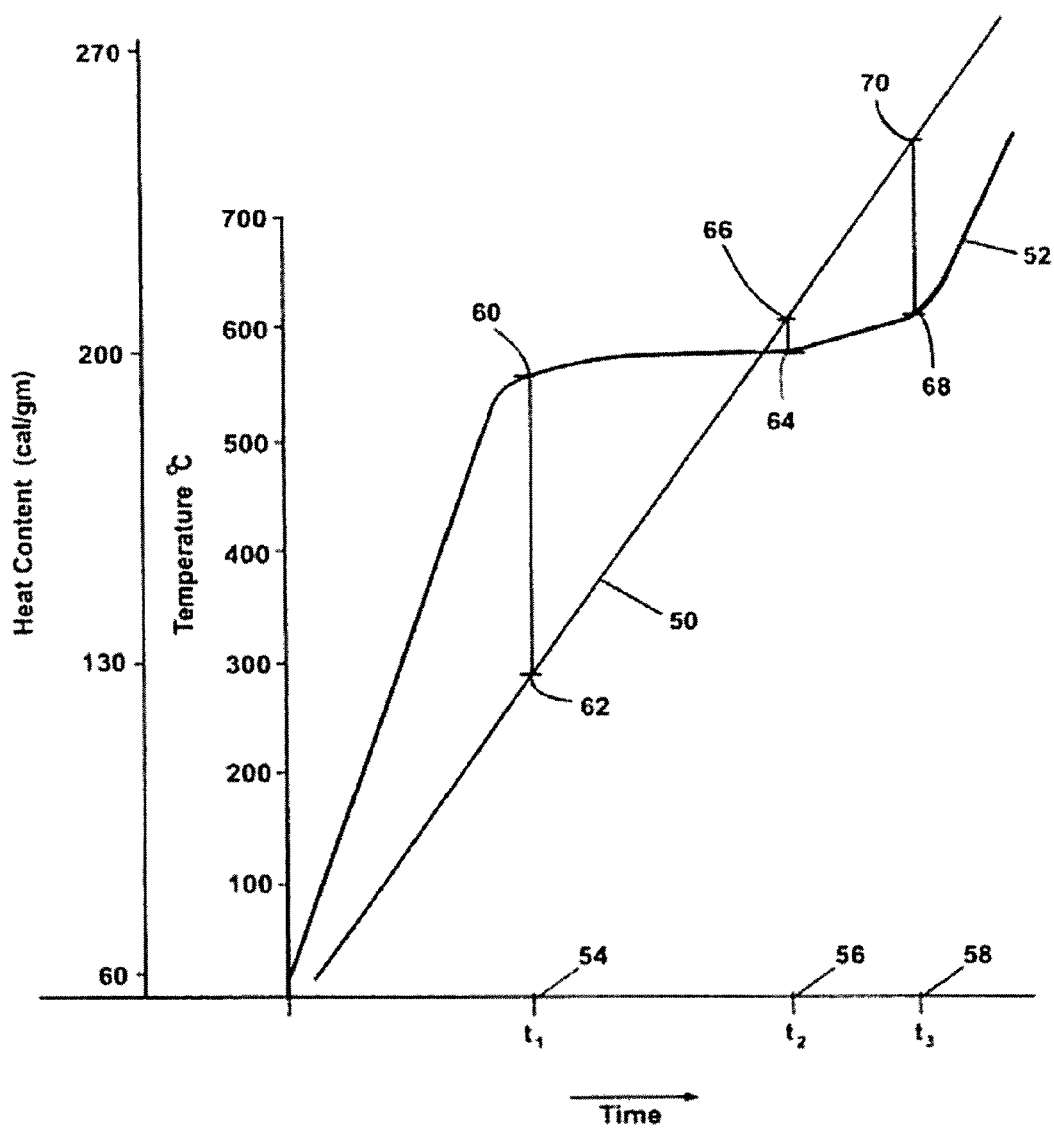
FIG. 3 is a representation of a non-limiting exemplary heat content vs. time curve and an exemplary temperature vs. time curve for a metal or metal alloy processed in the apparatus of FIG. 1.

FIG. 3 illustrates an exemplary heat content vs. time curve 50 and an associated exemplary temperature vs. time curve 52 for a metal charge heated at a constant input power and frequency. The temperature curve 52 is generally steeply linear up to a first temperature value 60, the solidus of the charge, characterized by a plateau portion between the first temperature value 60 and a second temperature value 64, the eutectic temperature of the charge, characterized by a moderate increase to a third temperature value 68, the liquidus temperature of the charge, and thereafter generally steeply linear, which represents the alloy in molten form. Time periods $t_1$, $t_2$, and $t_3$ as represented by reference numbers 54, 56, 58 respectively as associated with a time period that the metal or metal alloy reaches the solidus temperature, the eutectic temperature, and the liquidus temperature, respectively when the metal or metal alloy is exposed to a certain amount of energy. The plateau portion of the curve generally represents the metal charge in a SLM/SSM state. For instance, A356 grade aluminum alloy having about 7% silicon has a liquidus temperature of about 612° C. and heat content of about 260 cal/gm (i.e., temperature value 68 and heat content 70 at time $t_3$) and a solidus temperature of about 557° C. and heat content of about 130 cal/gm (temperature value 60 and heat content 62 at $t_1$) and a eutectic temperature of about 572° C. and heat content of about 225 cal/gm (temperature value 64 and heat content 66 at time $t_2$). The heat content and temperature can be correlated for a selected metal charge mass of a selected material in generator 10 having a selected configuration.

Figure 4:
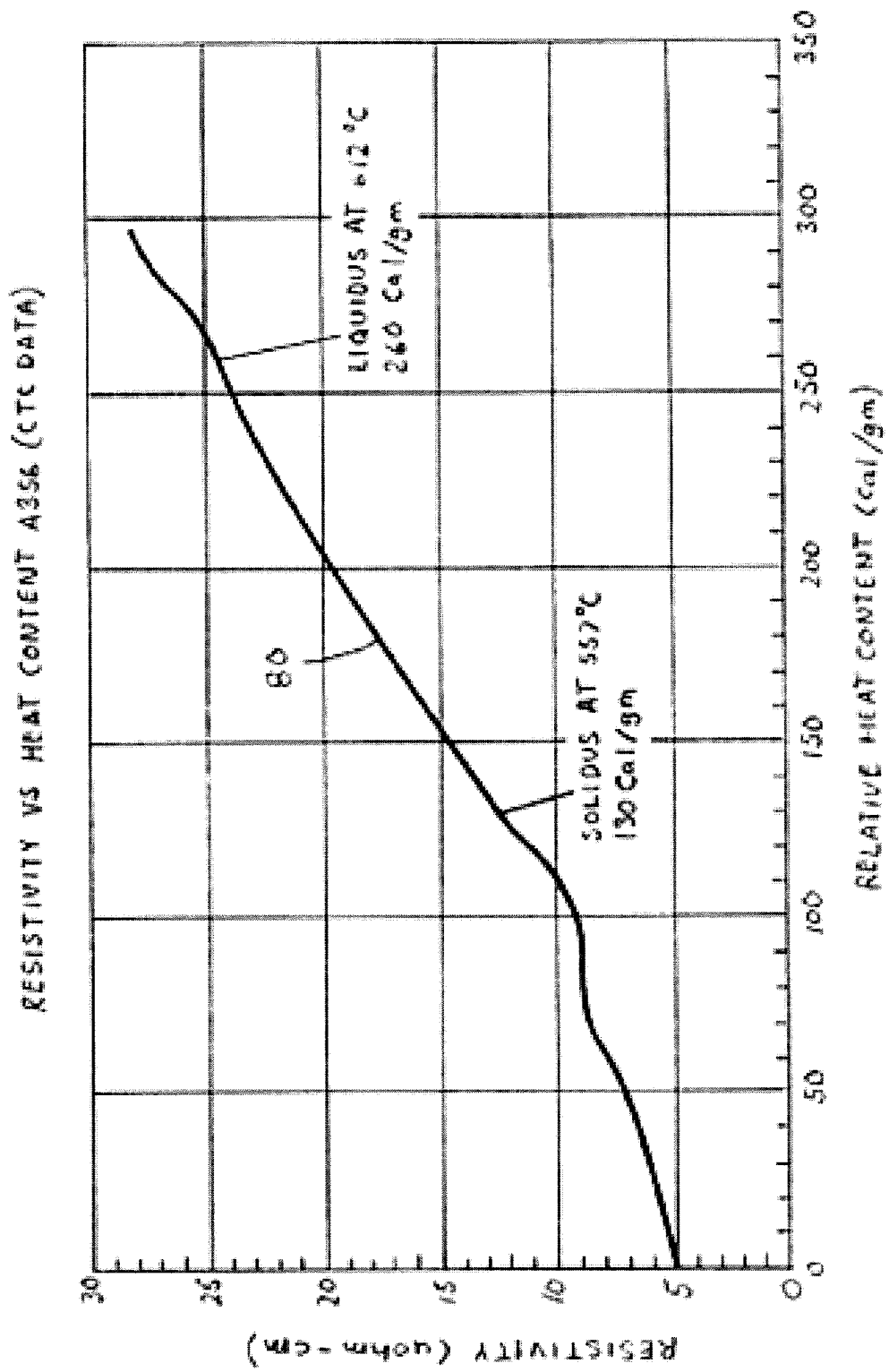
FIG. 4 is a prior art representation of an exemplary resistivity vs. heat content curve for a metal or metal alloy processed in the device of FIG. 1.

FIG. 4 illustrates an exemplary resistivity vs. heat content curve 80 for a selected metal charge mass of a selected material in generator 10 having a selected configuration.

FIG. 6 illustrates an exemplary viscosity vs. temperature curve 82 for a metal charge comprising an A356 grade aluminum alloy having about 7% silicon. An exemplary viscosity range 84 for SLM/SSM processing according to the present disclosure corresponds to an initial temperature (~630° C.) above the liquidus temperature of 612° C., ending at a SLM/SSM temperature of about 590° C. This corresponds to a final viscosity of about 4 centipoises.

Figure 7:
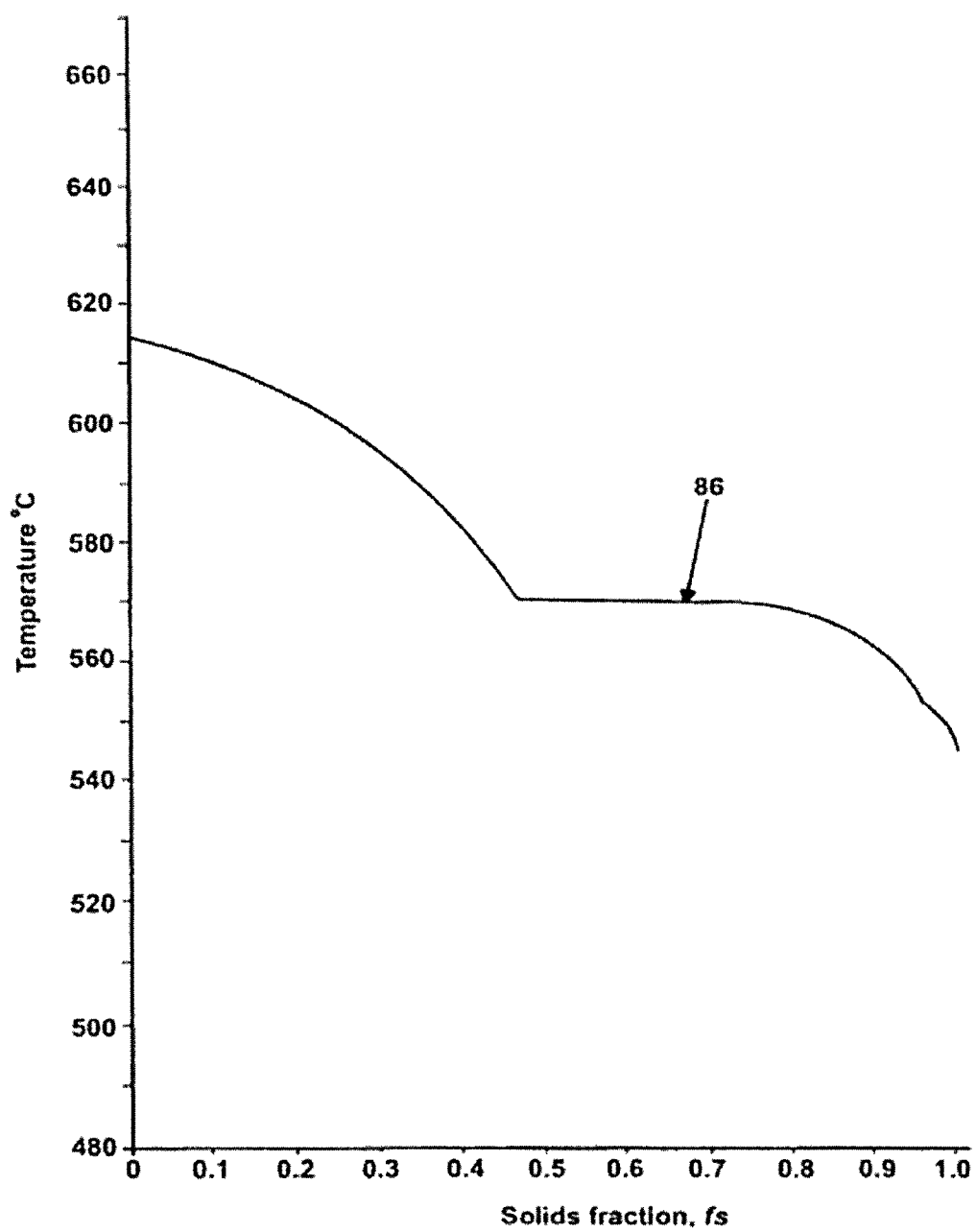
FIG. 7 is a prior art representation of a exemplary temperature vs. solids fraction curve for a metal alloy charge comprising an A356 grade aluminum alloy.

FIG. 7 illustrates an exemplary temperature vs. solids fraction curve 86 for a charge comprising a A356 grade aluminum alloy.

Figure 8:
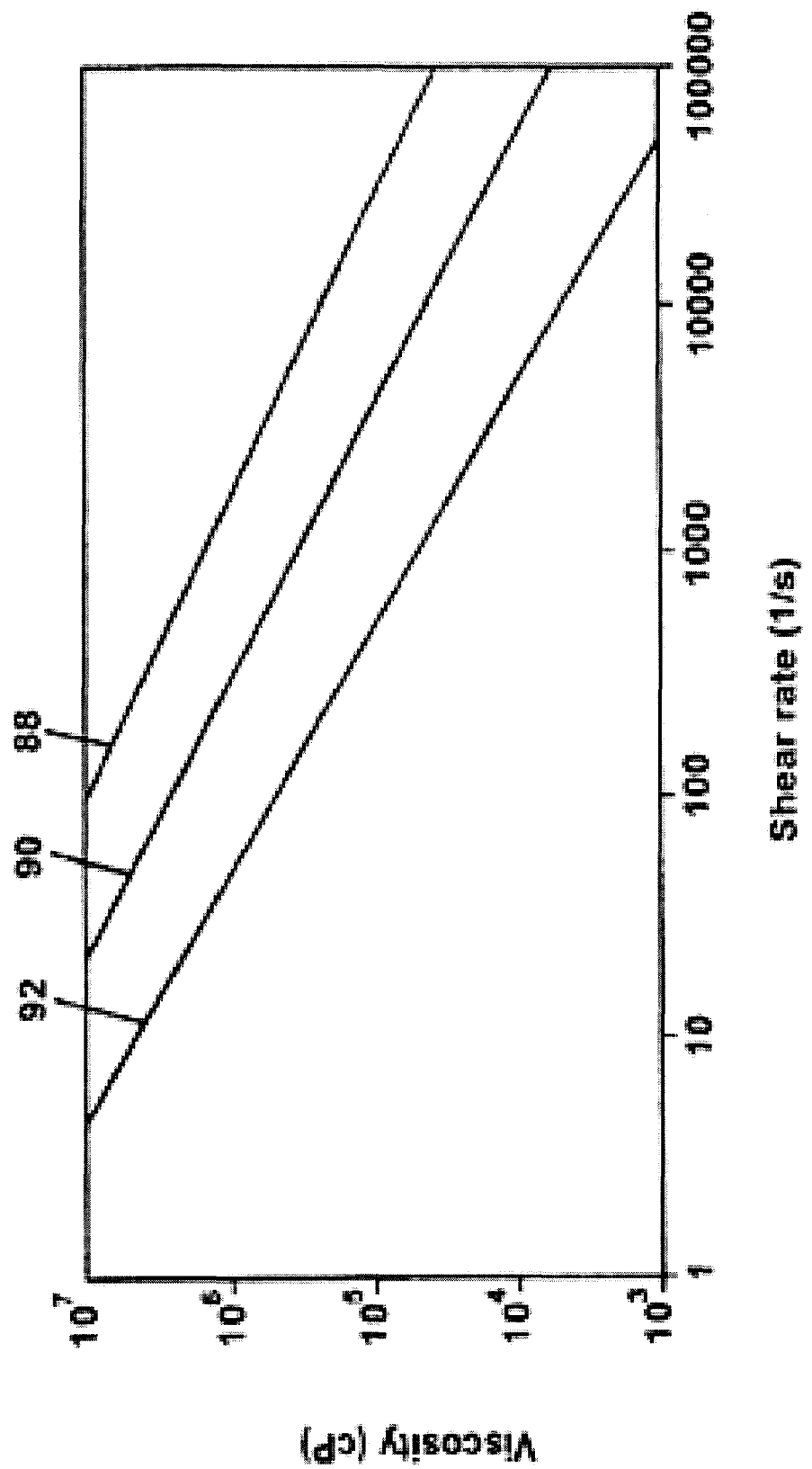
FIG. 8 is a prior art representation of a exemplary family of viscosity vs. shear rate curves for an A356 grade aluminum alloy having differing solids fractions.

FIG. 8 illustrates a family of viscosity vs. shear rate curves for a A356 grade aluminum alloy having about 70% solids fraction (curve 88), about 60% solids fraction (curve 90), and about 50% solids fraction (curve 92). FIG. 8 illustrates a decrease in viscosity with an increase in shear rate for all the solids fractions.

Figure 5A:
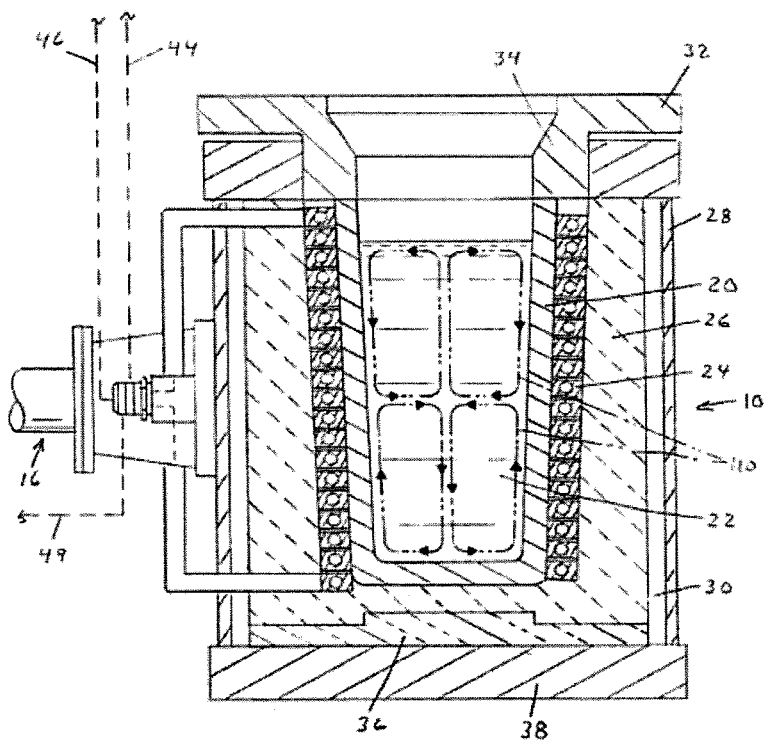
FIG. 5A is a schematic representation similar to FIG. 2 of the semi-liquid metal processing and sensing device, illustrating toroidal flow of the molten metal or metal alloy in the semi-liquid metal processing and sensing device using the crucible of FIG. 2.
Figure 5B:
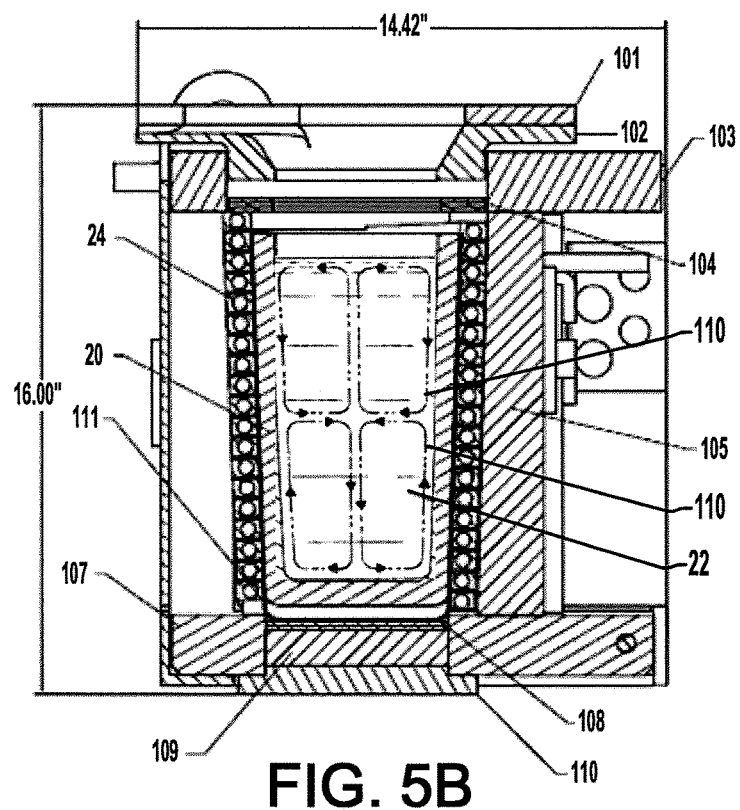
FIG. 5B is a partial sectional side elevation view illustrating toroidal flow of the molten metal or metal alloy using the crucible of FIGS. 2B-2H.

Referring to FIG. 5, the alternating current not only heats charge 22, but the alternating current can also induce agitation or mixing of metal charge 22 in crucible 20. The mixing is not circumferential or circular about a vertical axis within crucible 20. Rather, the mixing action is toroidal, as illustrated by the flow vectors 100. This toroidal motion results in circulation of metal charge 22 in a vertical direction along the inside of the crucible wall both upwardly and downwardly from the mid-plane of the charge and returning through the axial center of the metal charge. This toroidal mixing is more efficient in producing homogeneity of the melt at the interior surface area of the crucible to the center of the melt at the vertical axis of the crucible than circumferential mixing which does not circulate material from the edge to the center, but only in layers about the central axis of the crucible.

Referring again to FIG. 1, generator 10 and the connecting induction power leads 44, 46 are affixed to a multi-axis (typically 3 or more axes) robotic or mechanical arm assembly 16. As can be appreciated, generator 10 does not have to be connected to any type of robotic or mechanical arm assembly. For instance, the generator can be mounted on a stationary stand, in close proximity to the receiving part (shot sleeve, with or with trough) of the die-casting/injection machine. When the SLM/SSM charge is ready for pouring into the shot sleeve, the generator 10 tilts to pour the charge into the shot sleeve, thus eliminating the need for a robotic device; however; this is not required. The arm assembly 16 illustrated in FIG. 1, when used, can be adapted to manipulate generator 10 to a position to receive a molten metal charge from a source 14 such as, but not limited to, a dosing furnace, a metal pump, or a ladle. This position of generator 10 is identified in FIG. 1 as position "A." It is anticipated that the metal charge 22 will have been preheated to a temperature at or above the liquidus temperature of the metal charge when the metal charge is poured into the generator. After the generator has received the metal charge, the arm assembly 16 can be designed to move generator 10 to a delivery point at the forming station while the SLM/SSM is created; however, this is not required. At the forming station, the arm assembly 16 can be designed to tilt generator 10 to deliver the metal charge 22 to the forming machine 18, or generator 10 can be adapted with a plunger or piston to inject the metal charge 22 into the forming machine 18. This position of generator 10 is identified in FIG. 1 as position "B." The induction power supply 42 can either be an integral part of the arm assembly 16, or located remotely. In either configuration, the metal charge 22 can be continuously processed to ensure that the temperature and viscosity, solids fraction, and/or laminar flow conditions of the metal charge are maintained at selected values. The metal charge in the generator can be continuously processed by a) monitoring the resistance of the load system and/or the resistivity of the metal charge and/or generator 10, b) adjusting the induction coil power and/or frequency, and/or c) adjusting the flow of coolant through induction coil 24 and/or cooling coils to cool the metal charge 20 in a highly controlled manner until the selected temperature and viscosity of the metal charge 20 are reached as indicated by the resistance and/or resistivity. The SLM/SSM processing and sensing device of the preset disclosure enables precise control of the rate of cooling and/or heating of the metal charge in the generator, and the accurate, repeatable determination of when the selected temperature and/or viscosity of the metal charge has been reached. Because of variations in the metal charge constituents, as illustrated in Table 1, and variations in the operational and structural configuration of generator 10, the relationship between resistivity, metal charge temperature and viscosity is generally determined empirically. This relationship is based in part on the empirical relationship between heat content and solids fraction as illustrated, for example, in FIGS. 3 and 7. The relationship between solids fraction and viscosity of the metal charge, as illustrated, for example, in FIGS. 6 and 7, can be derived from analysis of metallurgical samples and experimental data of a selected metal charge composition.

As briefly discussed above, the temperature and viscosity of the metal charge 20 in generator 10 can be determined empirically by comparison to resistivity and/or resistance measurements. This empirical relationship will now be discussed in more detail. The relationship of the resistance of the load (RL) of the induction coil to the temperature of the metal charge 22 in the generator can be based on information that is calculated by use of empirical methods. The basis of this method is the change in resistance of the metal charge (e.g., aluminum alloy in the generator) as reflected in the feedback response of a powered induction coil surrounding the generator. The powered induction coil positioned about the generator operates at some known alternating frequency (e.g., 10-10,000 Hz, 500-5000 Hz, etc.). Due to the alternating current flow in the conducting coil turns, an alternating magnetic field is established in the vicinity of the coil that induces an opposite current flow in the load material (e.g., metal charge 22 and generator, when the generator is formed of a conductive material). It is this rapidly changing current flow induced into the load material that generates heat and also physical forces that act upon the load, which, in the present case, cause a toroidal stirring effect in the molten metal charge in the generator. For instance, a Lorentz Force acts upon the metal charge in the generator, which force is derived from Equation $F=(J_{x,y} \times B)$. This force represents the repulsion between the applied current creating the magnetic field flux density, B, and the induced current, J, in the molten metal charge.

The induction coil used in the present disclosure is multi-functional since it is designed to both heat the metal charge in the generator and to also regulate the cooling of the metal charge in the generator. The cooling of the metal charge is accomplished by conduction with internal coil cooling water via the generator and any intermediate material used to electrically isolate the induction coil from the metal charge and/or crucible of the generator. As stated above, the induction coil also serves as a source of heat to the metal charge due to the generation of eddy currents directly in the metal charge from the creation of alternating magnetic fields, which is the typical application for induction technology. The simultaneous heating and cooling effects allow for a precise and instantaneous control of the heating and/or cooling rate of the metal charge in the generator.

An induction system consists of a power supply source, load matching/tuning means and coil that acts upon the conducting load. The typical low-medium frequency induction power supply (PS) first creates DC power by rectifying incoming 3-phase line power and then by employing an inverter that creates a 1-phase alternating power output. This alternating power source, to affect a high efficiency utilization of power, must be matched, or tuned to the load to create a resonance effect. At resonance in a tuned circuit, a relationship exists between the frequency f, the capacitance C, and the inductance L as follows: At resonance: $f=1/((2\_) \cdot (L \cdot C)^{1/2})$. When tuned properly, the PS will have an output that will be at a fixed frequency. This reduces the impact of frequency variation on sensing and control. The frequency in an induction system also establishes the effective depth of the induced current penetration. The relationship is based on the following formula: Penetration depth/reference depth $\delta=3160 \ (\rho/\mu f)^{1/2}$ inches; where $\rho$ is the resistivity of the metal charge, $\mu$ is the relative permeability of the metal charge, and f is the frequency of the alternating power source. For non-magnetic materials such as ceramics and non-ferrous metals, $\mu=1$. Although the actual field penetrates to the center of the metal charge, the induced current density is greatest at the surface of the metal charge or generator if formed of a conductive material, and decays exponentially such that the reference depth accounts for the major portion of the generated heat in the metal charge.

The magnitude of the voltage output from the PS to the induction coil determines the current flow in the coil turns. It is this alternating current that creates the alternating magnetic field. The actual power (kilowatts) at the coil is determined by the voltage, current and the power factor of the load circuit. The power is represented by the following formula: $Pc=Ic \cdot Vc \cdot \cos \theta$; where $\theta$ is the phase angle between the AC current and the voltage. The power factor, or phase angle is dependent upon the dynamic interaction of the tuning components, PS frequency, the induction coil & load material coupling (e.g., geometric relationship and material properties of the induction coil). At near resonance in the practical parallel LCR circuit, the load impedance is primarily governed by the resistance in the transmission lines, induction coil and metal charge and generator if formed of a conductive material, thus the capacitance part of the circuit has no pure resistance component. As such, $X_L$ and the associated resistance $R_L$ comprise the impedance relationship of interest. The portion of the circuit of interest in this case is the inductive branch of the circuit, at which, the response of the load can be measured. This relationship is governed by the following formulas: $I_C=V/R_L$; $P_C=I^2 \cdot R_L$; and therefore $R_L=P_C/I^2$. As can be appreciated, if the frequency has a fixed value, then the only variables that will change are the resistance of the components that are affected by temperature and geometry, namely the load system (e.g., @ metal charge crucible and induction coil).

The voltage, current and power all change in response to changes in the material properties of the load system (metal charge, crucible and induction coil). These changes are typically temperature related as the load system heats up or cools down. The particular material property of the load system that is affected by temperature at the same time impacts the electrical characteristics of the load system is the resistivity $\rho$, which in turn is reflected in the resistance of the load system $R_L$. This relationship is represented by the following formula: $R_L=\rho\cdot(l/A)$; where l is the length of the load material, and A is the cross-sectional area of the material along length l·A is thus the cross-section of the conducing path represented by $A=\delta\cdot h_L$; wherein $\delta$ is the reference depth. The voltage, current and power are also sensitive to the amount and shape of the metal charge in the generator as it relates to the geometric coupling of the induction coil to the load system. Therefore the response of the voltage, current and power of the circuit can be used to determine what temperature changes have taken place in the load system by solving for $R_L$ and/or $\rho$.

Induction coils are commonly made from copper and are water-cooled. As such, the temperature changes in the induction coil are minimal; thus its resistivity is relatively stable and can be treated as a constant thereby having little impact on the electrical parameters. The grout or insulating material that can be used between the induction coil and crucible of the generator is typically a ceramic mixture that is stable and the resistivity values of such materials are at such a high value that they can be considered non-conductors and thus insignificant. The same principles can be applied to the crucible of the generator if the crucible is made from ceramic materials. However, if the crucible is a graphite material that is conductive, the crucible will have a resistivity value that changes with resulting temperature effects. The metal charge in the generator is not only influenced by conducted temperatures from the induction coil and generator, but the metal charge also generates its own internal inductive heat. The heat generated by the metal charge is dependent upon the operating temperature range of the metal charge and the frequency of the alternating magnetic field. The increase in heat generated in a graphite crucible is approximately 0.7% at a constant frequency of 1200 Hz, and over the temperature range of 550-650° C. Correspondingly, an aluminum alloy A356 increases its generated heat 39.0% over the same temperature range, with the same electrical, heating and physical conditions. Therefore the resistance contribution of a graphite crucible can be considered a constant over the temperature range of interest that is cited above. The changes in the properties (resistivity) of the metal charge in the generator due to the temperature are reflected in the electrical feedback signals measured at the load coil. In the case of metals and metal alloys, there are phase transformations that occur during heating of the metal and metal alloy from a solid to the liquid condition, and also in the reverse cooling mode. The solid melting point (solidus temperature) and the liquid melting point (liquidus temperature) define the lower and upper temperatures of the melting range of the metal or metal alloy, respectively. In this range for multiphase, nonferrous alloys, these temperatures are often difficult to measure accurately and to use for sensing the degree of melting or fraction solid (fs) of the metal or metal alloy. In addition, most of these measurement methods depend on sensors in direct contact with the molten metal and are prone to damage and degradation over time, such as thermocouples. However, several other material properties change in a more normal or near-linear fashion in this range which can be translated/correlated to temperature values for the metal or metal alloy. Some of these material properties are fs, relative heat content (enthalpy) and resistivity of the metal or metal alloy. The relationships between heat content vs. temperature, fs vs. temperature, and resistivity vs. temperature can be used to monitor and/or determine several properties of the metal charge in the generator. By sensing the resistance ($R_{TOT}$) and/or resistivity from the electrical feedback of the induction coil, various parameters can be deduced regarding the metal charge in the generator. For example various induction principles can be used to sense and consequently control the (slurry) process in an indirect fashion. As such, an induction coil of one or more windings can be used to sense the electrical reaction response of a load independently of the heating/cooling coil. A separately wound coil, typically of fine insulated wire, cooled or un-cooled can be placed in close proximity to the load container such that it is able to be influenced by the field induce in the load by the main heating/cooling coil; however, this is not required. This arrangement is called "eddy current" sensing. The sensing coil can be powered independently or unpowered and the generated feedback signals can be used in the same fashion as in the coupled case arrangement as discussed above to establish the condition of the load material.

A specific non-limiting process control system in accordance with the present disclosure will now be described. The process control system can include the use of an Ajax TOCCO Magnethermic "Coil Monitor" unit, a current transducer and potential transformers (PT) for measuring voltage. A current transducer (CT) can be connected to one of the leads supplying the 1-phase high frequency power to the induction coil. The leads from the PT's can be connected directly to the induction coil; one set across all of the induction coil turns and the other set across half of the induction coil turns on the bottom half of the induction coil. The signals from the CT and the first PT can be connected as inputs to the coil monitor unit. As can be appreciated, other configurations can be used in accordance with the present disclosure.

The metal charge that is to be introduced into the crucible of the generator is maintained in a melting/holding furnace. This melting/holding furnace is designed to hold a repeatable and accurate temperature (±3.0° C.) from a temperature set point. When the metal charge is inserted into the crucible, the power level of the induction coil about the generator (P initial) is such that the metal charge in the crucible does not immediately begin to cool, and the power level of the induction coil is such that it induces forces into the molten metal charge to cause a toroidal stirring action of the metal charge in the crucible. The stirring action is believed to be important in creating a homogeneous melt from the edge of the crucible to the center of the molten metal mass.

The setting for the power from the PS is reduced (P cooling) to the induction coil to cause the cooling capacity of the load system to overcome the heating capacity of the induction system, thereby causing the metal charge in the crucible to begin to cool. The metal charge continues to be stirred during the cooling process since power is still being applied by the induction coil to the metal charge. During the cooling process, the metal charge begins to cool rapidly from the molten phase to the semi-liquid/solid phase, thus passing through the liquidus temperature of the metal charge. Since the liquidus temperature is at the phase transition between the fully liquid/molten metal charge and the initiation of solidification of the metal charge, solid particles of high melting point constituents begin to nucleate and disperse via stirring into the homogeneous mass. This mass particle nucleation takes place due to the rapid cooling rate in the presence of the stirring of the metal charge.

Typically, in molten metal alloy systems, dendritic crystal growth occurs when the alloy is in contact with a cooled stationary surface, where stirring is not present in the molten metal bath. The formation of dendritic structure thus reduces the ability of the material to flow at these temperatures and fs levels, and thus increases the force required to move the material into a mold to form a cast part. In contrast, in the slurry system form by the process of the present disclosure, the creation of individual, free moving, individual partially rounded particles are beneficial to semi-solid slurry material flow since they allow the mass to exhibit a lower viscosity than dendritic material and require less force to move the material into a mold.

The monitoring of the generator can be accomplished by monitoring the single phase, high frequency AC electrical current and voltage feedback from the induction coil and converting the feedback to 0-5 VAC signals by the CT and PT units. These signals can then be inputted to the Ajax TOCCO Magnethermic "Coil Monitor" unit wherein the signals are multiplied to provide a true power signal, compared to an apparent power so as to determine the phase relationship, and then output as scaled 0-10 Vdc signals for Coil Current (Ic), Voltage (Vc) and true Power ($P_T$). This relationship is set forth by the following two formulas: $P_T = (Ic \cdot Vc) \cdot \cos \theta$, wherein $\theta$ is the phase angle between the high frequency AC voltage and current phasors; and $P_{app} = (Ic \cdot Vc)$, wherein (Ic) and (Vc) are the scalar values of voltage and current at the induction coil. The output signals from the Ajax TOCCO Magnethermic "Coil Monitor" unit can be connected as analog inputs to the System Programmable Logic Controller (PLC). In the control program, the measured true power seen at the induction coil ($P_T$) is divided by the square of the measured value of induction coil current ($Ic^2$). This value yields a value for R ($R_{TOT} = P_T/Ic^2$). The equivalent resistance of the load is calculated by the following formula: Reql=Rtot−Rc−Rcr−Rb, wherein Rc is the resistance of the coil, Rcr is the resistance of the crucible, and Rb is the resistance of the coil buss. The actual load resistance of the system is calculated by the following formula: R Load=Reql/$N^2$, wherein N is the number of coil turns of the induction coil. The resistivity of the load of the system is calculated by the following formula: $\rho l = [(Reql \cdot hl \cdot 3160)/(2 \cdot \pi \cdot rl \cdot N^2)]^2 \cdot 1/f$, wherein hl is the length of the load, $\pi$ is the mathematical value of Pi, and f is the current frequency to the induction coil. The ($R_{TOT}$) value has been found to correlate well with the resistivity value $\rho$ (load). This correlation is illustrated in FIG. 9.

Figure 9:
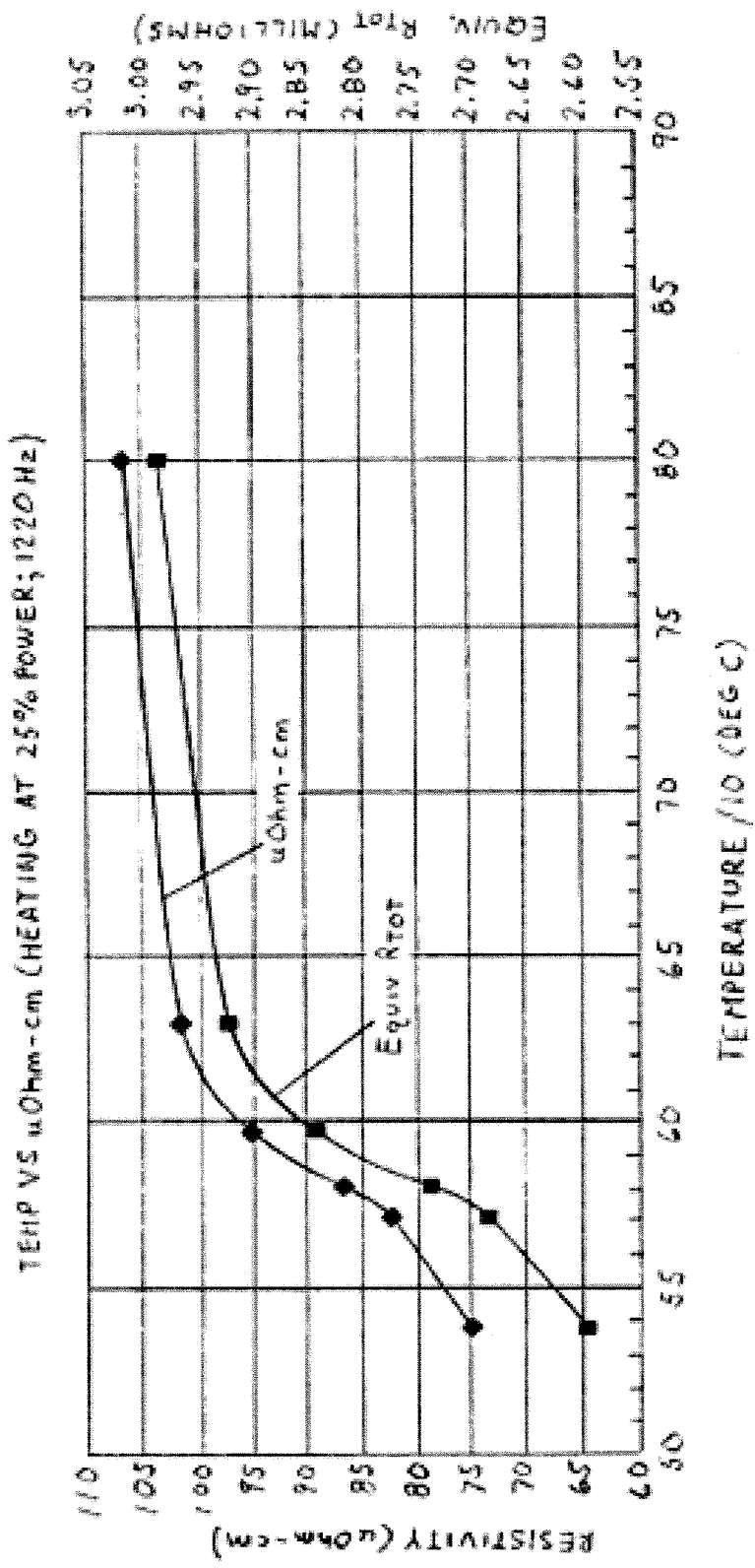
FIG. 9 is a graph illustrating the relationship between temperature versus resistivity data and temperature versus the total resistance in an induction coil.

As illustrated in FIG. 9, the $R_{TOT}$ data, which is represented by the lower line, is very similar to and creates a very similar curve as the $\rho l$ data, which is represented by the upper line. Indeed, the results measured correlate well with the values calculated. The result of the calculation of the measured values R ($R_{TOT}$) is a resistance feedback signal that is repeatable cycle to cycle and that can be used as a control parameter for heating and cooling of the metal charge in the generator.

Figure 10:
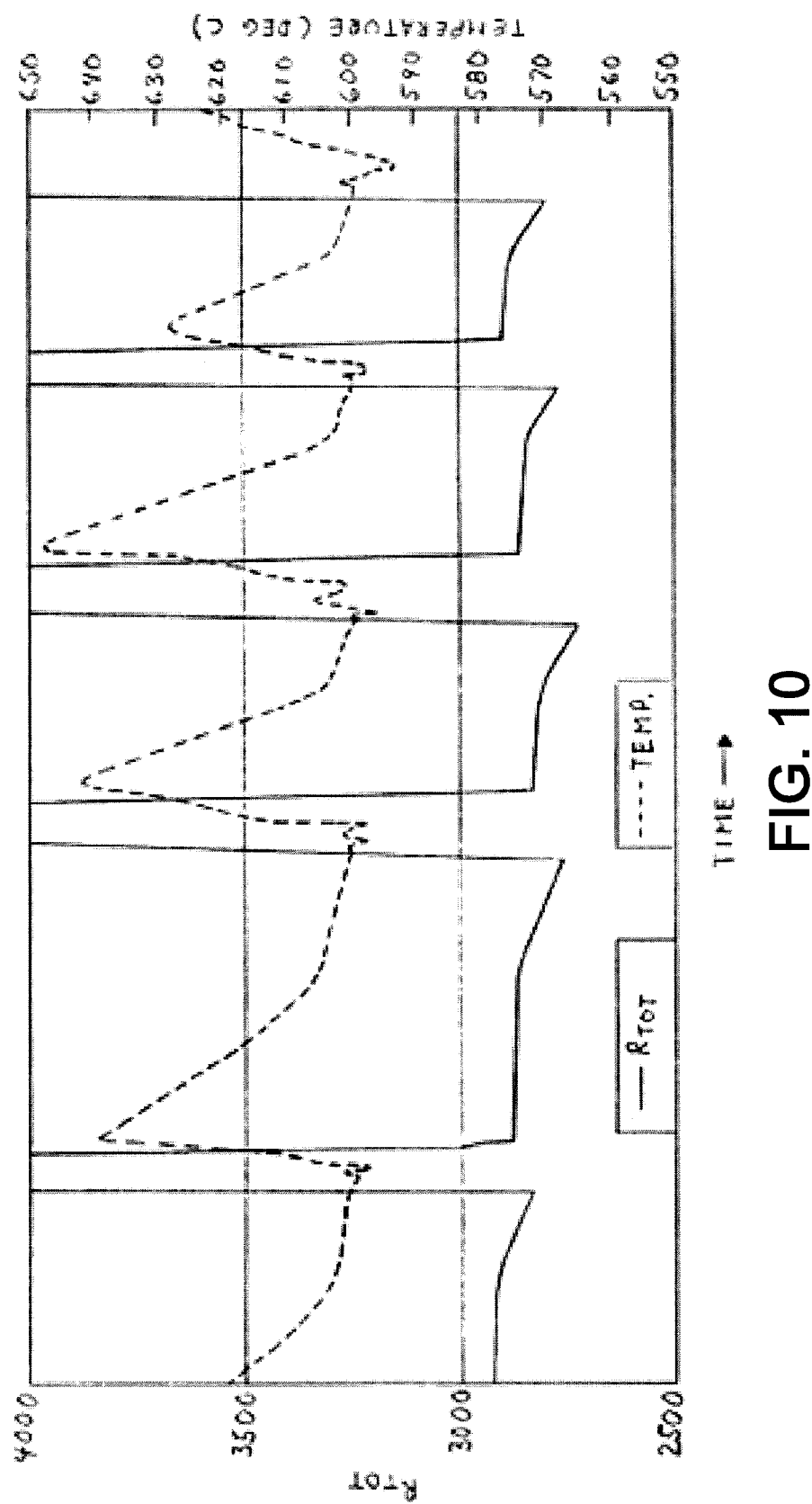
FIG. 10 is a graph illustrating the relationship between temperature and the actual load on the induction coil during a certain time period.

FIG. 10 illustrates the liquidus relationship of the metal charge. Specifically, FIG. 10 illustrates the $R_{TOT}$ and corresponding temperatures. The behavior of the measured $R_{TOT}$ value as the metal charge cools in the generator from the liquid phase to the semi-solid region appears as a slight, negative constant rate of change from a higher liquid value corresponding to the liquid alloy temperature. As the metal charge material cools, it reaches the liquidus temperature, wherein nucleation of solid particles begins to take place. Also at the liquidus temperature, the $R_{TOT}$ value changes from a slight slope to a more pronounced negative slope value. The reason for this is that the metal charge load is cooling from a region of low resistivity change per change in temperature into a region where the resistivity changes are more significant per change in temperature. Since the metal charge load is the only item in the system that is drastically changing, the other components of the process system either remain constants or are slightly changing in a generally linear fashion. As such, the measure changes are primarily due to the metal charge temperature and consequent resistance change.

The use of this "R Load" or "$R_{TOT}$" signal for control takes place in the PLC. The calculated "R Load" or "$R_{TOT}$" signal can be tracked as a first derivative with respect to time. When the liquid metal charge is initially poured into the crucible of the generator, the value of the power to the induction coil is reduced to a predetermined value allowing the metal charge in the crucible to begin to cool. A few seconds is typically allowed for the signal to stabilize and for the establishment of the d(R)/dt value and the monitoring of this value. When the metal charge cools to the liquidus temperature, the temperature rate of change reduces as the material becomes semi-solid. Correspondingly, the resistance signal changes as well. However, the resistance change is such that the d(R)/dt decreases. This change in resistance at the liquidus temperature can be used in the control scheme as an initial reference point for determining the degree of semi-solid condition, fs, and control requirements; however, this is not required.

The PLC can be programmed to perform an iterative time and magnitude gate check of the signal as the resistance change occurs. This check can function as verification that the change seen is real and not a response to random signal noise (variation). The verified "R Load" or "$R_{TOT}$" signal can be measured and continues to decrease in value until a preset $\Delta R = (R_{LIQ} - R)$ is achieved. The preset R value can be chosen as representative of the desired fraction solid of the metal charge for the subsequent forming operation. As can be appreciated, the value of the resistance feedback, which reflects the temperature/fs, is prone to some degree of variation during the cooling of the metal charge.

The resulting variation in cycle time of the cooling of the metal charge in the generator will introduce downstream variations in the forming process, and consequently introduce potential problems relating to part quality and defects that are formed in the forming machine. A correction process can be performed in the PLC which measures the feedback signal dR/dt and calculates the real projected cycle time and then compares this value to the target cycle time. Based on this projected time, a new cooling power level can be determined and entered into the high frequency power supply. As a result of this correction, a cooling rate that arrives at the Target Cycle time as the R value reaches the preset $R_{TARGET}$ can be achieved so as to not impede the delivery of the metal charge from the generator to the forming machine.

An additional active control can be used to assist in achieving repeatable cycle time, such as a "Hold" segment of the PLC program. If the $R_{TARGET}$ value is achieved before the cycle time window is completed, then the program can be designed to perform an internal PID control with the target value ($R_{TARGET}$) as a set-point. The control will maintain the target R value until the cycle time is complete. When the $R_{TARGET}$ and Cycle Time conditions are satisfied, the signal to pour is given to the process system and the tilt mechanism pours the contents of the generator directly into the receiver or shot sleeve of the forming device. The forming device could be a die cast machine (either a horizontal or a vertical unit), gravity semi-permanent mold machine, sand mold or other configuration. Generally a die cast machine is used which can benefit from the slurry charge control and short cycle times, which can lead to increased productivity. At the same time as productivity increases occur, the quality of the product will be improved by the high fs structure of the slurry material.

Figure 11:
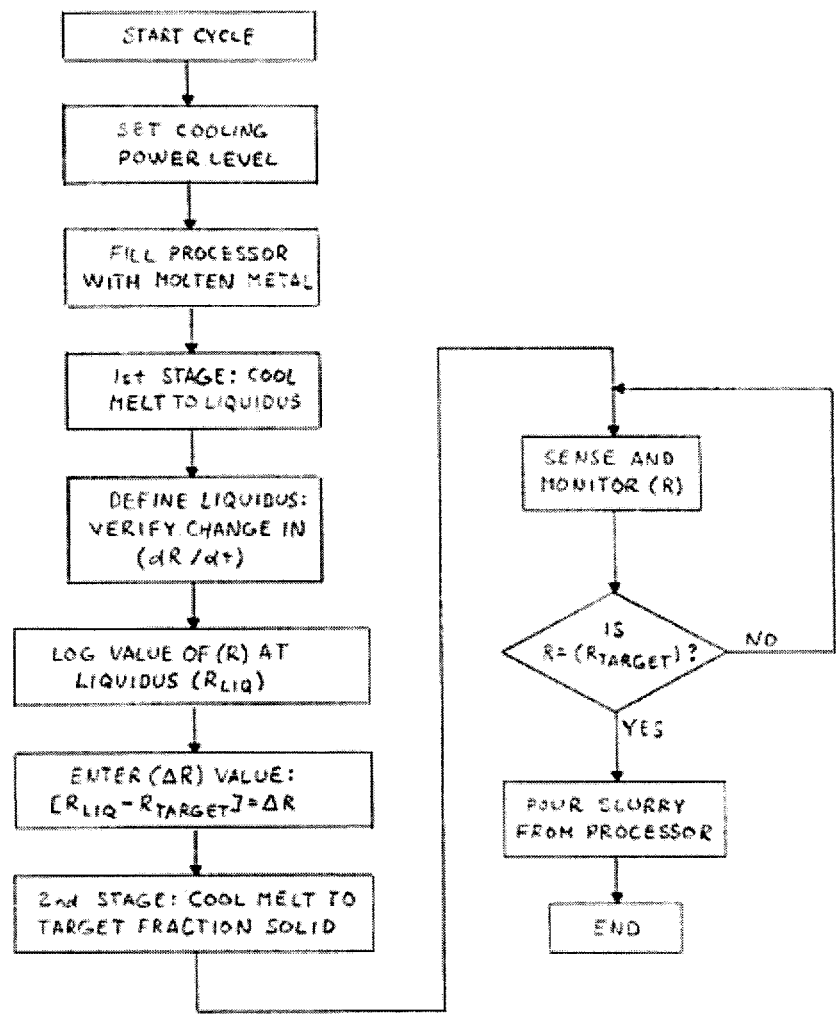
FIG. 11 is a process flow diagram illustrating one non-limiting process arrangement in accordance with the present disclosure.

Referring now to FIG. 11, there is illustrated a process flow diagram illustrating one non-limiting process arrangement in accordance with the present disclosure. The first step of the control process is to start the process cycle. The next step is to set the cooling power level for the induction coil. The next step is to fill the crucible of the generator with a molten metal charge. At the time the crucible is being filled with a molten metal charge from a furnace, the power level to the induction coil is sufficient to prevent the temperature of the molten metal charge from dropping below the liquidus temperature of the metal charge; however, this is not required. Generally, the power level for the induction coil is initially set so there is very little temperature drop in the molten metal charge as the molten metal charge is transferred from the furnace to the crucible in the generator. Once the crucible is filled to a desired level with the molten metal charge, the next process step illustrated in FIG. 11 is to cool the metal charge in the crucible to the liquidus temperature of the metal charge. For each type of metal or metal alloy that constitutes the metal charge, there is a specific liquidus temperature for such charge. The resistivity of the metal charge at the liquidus temperature is indicated in the flow diagram as $R_{liq}$. During the cooling process of the metal charge to the liquidus temperature, the resistance of the load inside the induction coil (e.g., metal charge plus the crucible, if the crucible is formed of a conductive material) is sensed (R), and can be recorded. The first derivative of the sensed resistance (R) with respect to time is monitored The trend of this first derivative in the fully molten phase of the alloy is slightly positive. When the liquidus point of the alloy is reached, the first derivative of reflected R trends negative. The change in the derivative is verified by the programming of several gate conditions in the PLC which determine beyond any signal noise that the liquidus point has been reached. Once it has been verified that the metal charge in the crucible has reached the liquidus temperature, the second stage of the process begins wherein the metal charge is cooled below the liquidus temperature, but above the solidus temperature. A new load resistance set point $R_{target}$ is calculated in the control system. A preset value of a ΔR is used along with the $R_{liq}$ to determine the $R_{target}$. $R_{target}$ is relative to the sensed value of $R_{liq}$. This new Load resistance set point $R_{target}$ represents a certain temperature for the metal charge wherein the metal charge has a certain solids fraction and liquid fraction that is desirable for delivery to a casting or forming machine. The power level to the induction coil can be adjusted or read from the PLC during the second stage of the cooling of the metal charge so that the metal charge is at the desired temperature and includes the solids fraction and liquid fraction at the time the metal charge is to be delivered to the casting or forming machine. As such, the power level to the induction coil may have to be 1) further reduced to increase the cooling rate of the metal charge in the crucible, and/or 2) increased to slow the cooling rate of the metal charge in the crucible. As can be appreciated, the power level to the induction coil can be adjusted one or more times during the second stage of the cooling of the metal charge so as to meet the target time the metal charge is to be delivered to a casting or forming machine. During the second cooling stage the resistance of the induction coil load is sensed (R), and can be recorded. The sensed resistance is then compared to the second resistance set point $R_{target}$. If the detected resistance R is equal to $R_{target}$, then the metal charge is determined to be at the desired temperature and have the desired liquid and solids fraction, thus can be poured into or otherwise deposited into a casting or forming machine. If the casting or forming machine is not ready to accept the metal charge, the process system of the present disclosure can be designed to maintain the metal charge in the crucible at $R_{TARGET}$ until the casting or forming machine can accept the metal charge. If the sensed resistance of the induction coil load is not equal to the resistance set point $R_{TARGET}$, the power level to the induction coil is decreased, increased or maintained to cause the sensed resistivity R to approach $R_{TARGET}$. Various mathematical techniques can be used to determine the rate at which the sensed resistance, R is approaching $R_{TARGET}$ and whether the trend of the sensed resistance R to $R_{TARGET}$ over time is correct or requires adjustment by changing the power level to the induction coil. As illustrated in the process flow diagram, the sensed resistance, R is compared to $R_{TARGET}$ until the two values are the same. It is intended that the methods of programming the control for this process ideally enable the $R_{TARGET}$ condition of the material to be reached concurrently with the desired cycle time of the forming machine. Once the metal charge is poured or otherwise deposited into a casting or forming machine, the control process is complete and a new process can be started.

Figure 12:
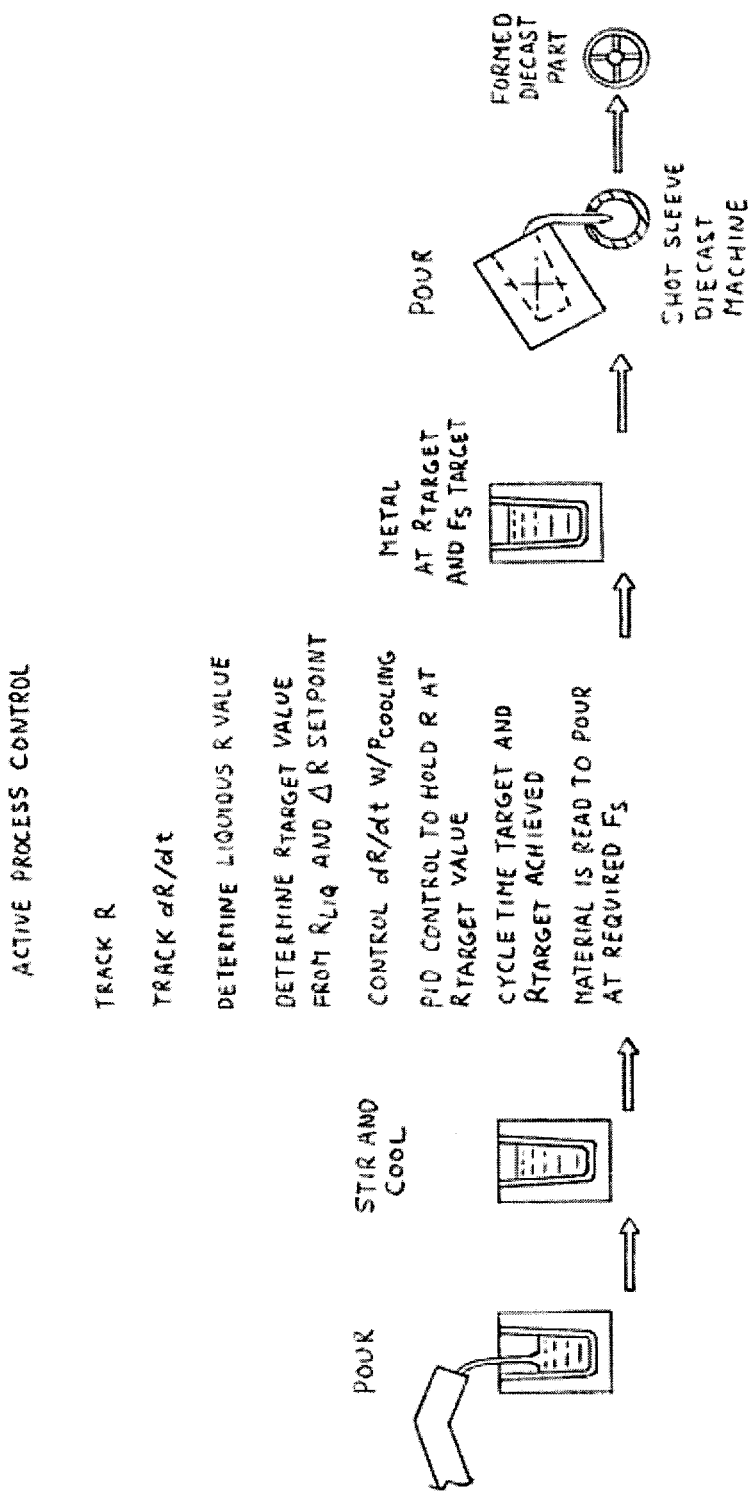
FIG. 12 is a non-limiting simple process illustration for processing a metal charge in accordance with the present disclosure.

Referring now to FIG. 12, there is illustrated a non-limiting a simplified illustration for processing a metal charge in accordance with the present disclosure. The first picture illustrates a molten metal charge being poured into a crucible of a generator. The temperature of the metal charge at this point is above the liquidus temperature. The manner in which the metal charge is conveyed to the crucible from the furnace is not limiting. The type of furnace used to melt the metal charge is also not limiting. Once the metal charge is deposited into the crucible, the metal charge is stirred and cooled until the metal charge reaches the liquidus temperature of the metal charge. This process step is the same or similar to the first stage of cooling as discussed above with regard to the process flow diagram illustrated in FIG. 11. From the time that the metal charge is deposited in the crucible to the time that the metal charge is removed from the crucible, a process control system is used to control the cooling rate of the metal charge in the crucible, temperature of the metal charge in the crucible, and solid and liquid fraction of the metal charge in the crucible. One non-limiting example of a process control system that could be used is illustrated in FIG. 11. This process control system is illustrated as Active Process Control in FIG. 12. In one non-limiting arrangement, the Active Process Control includes the use of (3) preset values for the high frequency power to the induction coil, namely 1) a preset value at the time the metal charge is poured into the crucible, 2) a preset value for the cooling cycle of the metal charge in the crucible, and 3) a preset value for the metal charge at the time the metal charge is to be removed from the crucible. The Active Process Control can include several modes of operation. One operation mode is a Cycle Time Target Mode that is used to identify the cooling rate (dR/dt) after the metal charge has been cooled to its liquidus temperature. The Cycle Time Target Mode is designed to change the cooling power to the induction coil to allow the $R_{TARGET}$ to be achieved at same time as the Cycle Time Target. Another operation mode is a Hold Mode. The Hold Mode is designed to allow the $R_{TARGET}$ value to be held constant by varying the cooling power to the induction coil via a PLC based PID control loop until the Cycle Time Target is reached. Another mode is a Charge Level Sensing 1 Mode. This Charge Level Sensing 1 Mode is designed to enable a determination of the amount of metal charge in the crucible after being poured into the crucible. Since the value of "R Load" or "$R_{TOT}$" is stable and relatively constant during the liquid phase cooling of the metal charge; the amount of metal charge in the crucible will change the metal charge geometry such that the "R Load" or "$R_{TOT}$" signal level can reflect the amount of metal charge in the crucible. The PLC, based on the level of "R Load" or "$R_{TOT}$", can either accept the metal charge as within process limits, abort the cycle if the metal charge is too much or too little material to obtain a repeatable, quality forming operation. Another mode is a Charge Level Sensing 2 Mode. The Charge Level Sensing 2 Mode is designed to utilize the same metal charge level sensing logic as the Charge Level Sensing 1 Mode. The Charge Level Sensing 2 Mode is designed to make a decision, based on empirical data of dR/dt versus volume at a given power level and melt temperature, whether to set the cooling power of the induction level up-or-down to project a reasonable target time for $R_{LIQ}$ to occur, or the entire Cycle time target to occur. Another mode is a Melt Temperature Compensation Mode. The Melt Temperature Compensation Mode is designed to determine an initial cooling power level based on the incoming temperature of the liquid metal charge. If the liquid metal charge is cooler than the set-point value, a proportional power adjustment up will be set to allow $R_{LIQ}$ to occur in an acceptable time window, and the total cycle time to occur in a reasonable time window. This mode keeps all of the other control modes from enabling drastic power changes for their compensation actions. One or more of these modes can be used in the Active Process Control of the present disclosure. As can be appreciated, other or additional control modes can be used in the present disclosure. Once the metal charge in the crucible is at $R_{TARGET}$ and the $fs_{TARGET}$, the metal charge can be poured or otherwise ejected from the crucible into a shot sleeve or other receptacle of a die cast or forming machine as illustrated in FIG. 12. The metal charge is then formed into a die cast part. The crucible can be refilled with a new molten metal from the furnace and the Active Process Control can be repeated for the new metal charge.

As discussed above, generator 10 can be designed to perform one or more of the following functions:

Continual sensing or periodic sensing of the condition of the SLM/SSM beginning with the introduction of the molten metal charge 22 into generator 10 and ending with the delivery of the processed SLM/SSM into a forming machine, i.e., a shot sleeve, a sprue, a funnel, and the like.

Control of the cooling, heating, and/or agitation of the SLM/SSM to ensure that the material delivered to the forming machine is of repeatable, consistent thermal, micro-structural, and/or viscous condition.

Transfer of the metal charge 22 to a forming device directly from generator 10 without an intervening container or transfer step. Generator 10 can be mechanically uncoupled from either the molten metal source and/or the forming machine; however, this is not required.

A non-limiting feature of generator 10 is the ability to remotely sense the condition of the SLM/SSM charge, and/or to control the heating and/or cooling process based on feedback from the non-contact sensing apparatus, i.e., the induction coil 24. Additionally or alternately, a feedback signal can be obtained from a second, unpowered coil (not shown) in close proximity to the molten metal charge 22. The induction power unit can comprise a controller 40 as illustrated in FIG. 1 that is adapted with signal conditioning electronics designed to continuously or periodically monitor the load from the induction coil and/or unpowered coil. In most cases, the load will comprise the induction coil 24 and the conductive material monitored by the coil 24. The conductive material can comprise the SLM/SSM charge 22 in the crucible 20, and can additionally comprise the crucible 20 itself if the crucible material is conductive, e.g. graphite or metal. In another and/or alternate non-limiting embodiment, generator 10 can be configured with an induction coil that is "tapped" at selected locations along its length; however, this is not required. This configuration enables selected portions of the coil to be selectively energized in order to provide an additional degree of control to generator 10. Specifically, the portion of the coil energized can be selected based upon the size of the metal charge, with shorter lengths of the coil energized for smaller amounts of metal charge in the crucible. In yet another and/or alternative non-limiting embodiment, different generators 10 having different coil lengths can be utilized for metal charges of different mass; however, this is not required.

Electrically sensed changes in the load are due to thermal changes and metallurgical changes in the molten metal charge as it either cools or heats. One of the changes is a resistivity change in the metal charge that produces a change in the induction coil voltage. This voltage can be used as a feedback signal to control the heat/cooling process of the metal charge in the crucible. Using the signal conditioning features in the induction control system, this voltage and/or other available signals reflecting the metal charge condition can be used to modulate and control the physical process of cooling, heating, and/or maintaining the condition of the metal charge in the generator. Many induction control systems have the added ability to generate and track a signal even when modulating the power output. Therefore, control of the SLM/SSM process can be designed to be continuous, non-contact control system (i.e., no thermocouple required in the metal charge and/or crucible wall), and/or be capable of adjustment to a desired operating point while delivering the metal charge to the forming station.

Another non-limiting embodiment of the device and its application is the use of generator 10 in conjunction with other SSM/SLM production methods. For example, generator 10 can be operably combined with a device that can initiate the nucleation process. Generator 10 can be utilized to maintain a homogeneous melt temperature. After nucleation, the nucleated SLM/SSM mixture can be further cooled and maintained at controlled delivery conditions by generator 10.

Generator 10 also can be designed to control the delivery of the metal charge 22 in a carefully controlled condition to the forming station 18. Depending on the design of the forming machine, and its charge receptacle, generator 10 can either be tilted to pour the metal charge into a vertically or horizontally oriented shot sleeve, such as typically used in a die-cast machine, or a low-pressure permanent mold forming device. In a forming process that requires the metal charge to be highly viscous, similar to an SSM billet, the metal charge can be processed in generator 10, and the generator can deliver the metal charge into a specialized sleeve adapted to receive the more highly viscous SLM/SSM shaped billet (e.g., cylindrical shaped billet, etc.). Generator 10 can be adapted with bottom-sealed refractory or a metal piston that can function as a physical plunger to eject the metal charge 22 from the crucible 20, and be coupled with a hydraulic cylinder to function as an integral shot rod and plunger tip; however, this is not required.

Because the generator 10 is induction powered, any unintended cooling or freezing that might occur in the crucible 20 can be melted out. The ability of generator 10 to heat can also be utilized to prevent the accumulation of solidified oxide skins or skulls in the crucible 20, which skins and skulls can cause product defects such as pre-solidified inclusions. The capability of the Generator 10 to "self clean" without the use of a separate physical contact device is very advantageous.

An alternate non-limiting embodiment of generator 10 is that it can be part of a fully coupled unit. A coupled generator can be adapted to accept a metered metal charge though a heated transfer tube directly from a dosing furnace or molten metal pump. The molten metal charge can be designed to pass through a generator wherein the metal charge is cooled and agitated as in the above-described generator. The induction coil can be a single solenoid coil powered by a single frequency generator, or triple-wound independent coil supplied by a three phase frequency induction generator to enhance metal movement through the generator portion. The metal charge can be maintained in the generator portion at a controlled condition. When the process cycle calls for SLM/SSM to be injected, the metal supply device (e.g., pump or dosing unit) is actuated, and the generator portion allows or causes the metal charge to proceed to a heated conduit and into a forming or injection chamber as a new volume of molten metal is introduced into the generator portion. This method is suitable for a dedicated forming station that produces SLM/SSM parts exclusively.

The semi-liquid metal processing and sensing device of the present disclosure provides the ability to precisely control the cooling and/or holding process for a metal charge in the generator by cooling rate and end condition, which enables the delivery of a SLM/SSM charge in a repeatable fashion to a forming device, even in the event of a cycle delay or production interruption. This arrangement is a unique feature of generator 10 that is not currently available from prior art SLM/SSM devices.

Generator 10 can be designed to be relatively easy to operate, and not require extensive training, and/or be capable of delivery of repeatable, consistent metal charge to a forming station. The non-contact sensing and control, as well as the ability to fully control the thermal behavior of the metal charge in the generator enables a highly efficient and effective production process. Generator 10 can be readily incorporated into a production line, and can be designed to be easy maintained by simply exchanging generator units on the robot arm.

Figure 13:
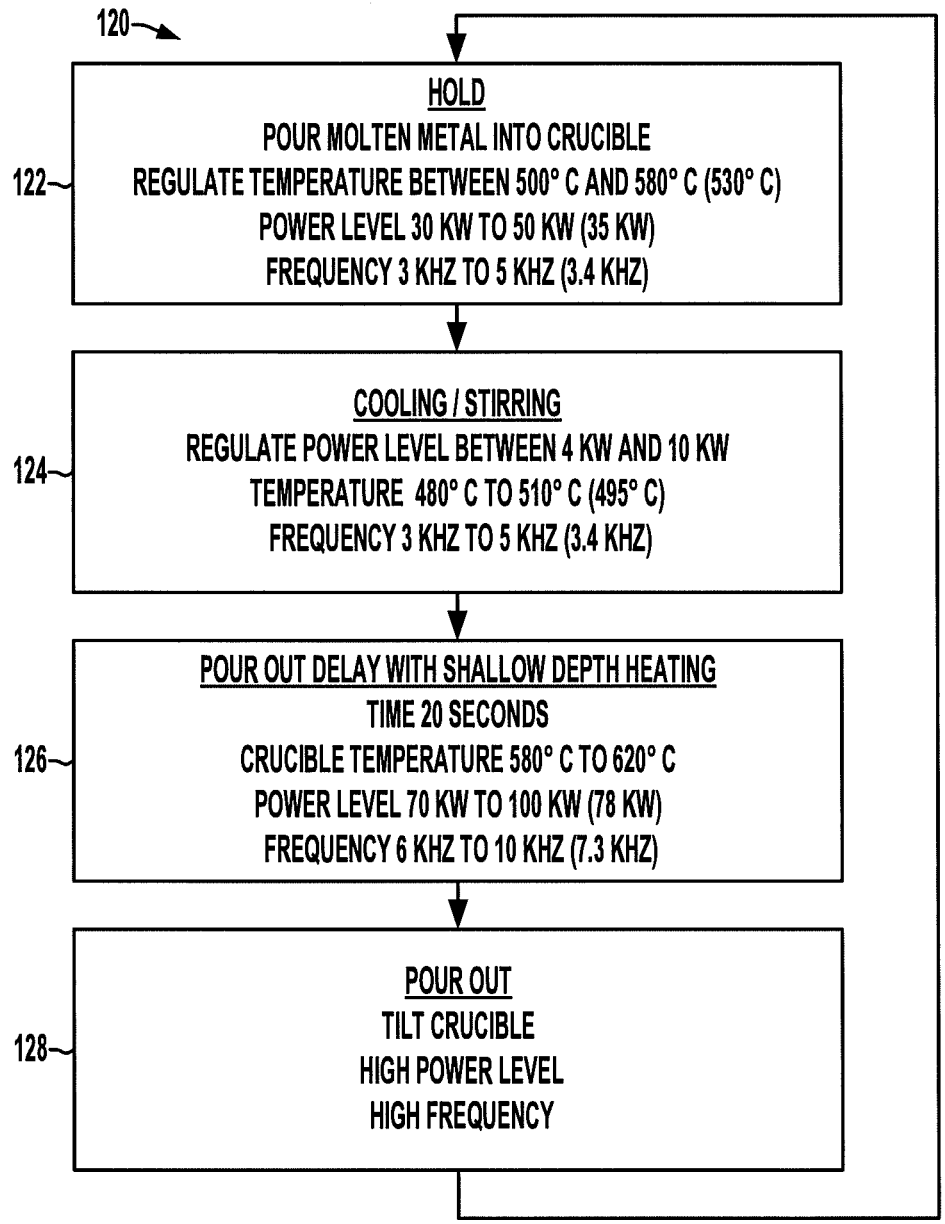
FIG. 13 is a flow diagram illustrating an exemplary dual frequency method for processing a metal charge in accordance with the present disclosure.

Referring to process 120 in FIG. 13, another aspect of the present disclosure involves dual frequency control to facilitate pouring of the metal charge 22 from the crucible 20 into the forming machine 18. As previously noted, the tapered shape of the crucible 20 facilitates extraction of the metal charge 22 from the crucible 20 with the assistance of gravity with the crucible tilted. In the process 120 of FIG. 13, moreover, frequency control is performed at different frequencies with the addition of a "POUR OUT DELAY" step 126 in which relatively high frequency power is applied to the induction coil 24 prior to tilting the crucible 20.

For each process cycle, an initial "HOLD" step 122 involves pouring of the molten metal into the crucible 20. At 122, the temperature of the crucible in certain embodiments is regulated between 500° C. and 580° C., such as about 530° C. in one nonlimiting example. At 122, moreover, the power level in certain embodiments is between 30 kW and 50 kW, such as about 35 kW, and the frequency of the power applied to the induction coil 24 is about 3 kHz to about 5 kHz, such as about 3.4 kHz in certain embodiments.

At 124, a COOLING/STIRRING step is used, in which the power level is regulated between about 4 kW and about 10 kW in one example, where the crucible temperature in certain embodiments is about 480° C. to about 510° C., such as about 495° C. in one nonlimiting example. Moreover, the power supply frequency is controlled at 124 between about 3 kHz and about 5 kHz, such as about 3.4 kHz in one implementation.

A POUR OUT DELAY step 126 follows the cooling/during, in which a higher frequency is used for powering the induction coils 24. In certain examples, the process step 126 is controlled for a certain period of time, such as about 20 seconds and one non-limiting example. At 126, moreover, the crucible temperature in certain embodiments is about 580° C. to about 620° C., and the power level is about 70 kW to about 100 kW, such as 78 kW in one embodiment. The pour out delay frequency, moreover, is preferably higher than that used in the prior cooling/stirring step 124. In certain embodiments, for example, the pour out delay frequency is about 6 kHz to about 10 kHz, such as about 7.3 kHz in one specific embodiment.

Following the pour out delay processing at 126, a POUR OUT step 128 is performed, in which the crucible 20 is tilted, and the induction heating coil 24 is powered using relatively high power at a high frequency. For example, the induction coil 24 may be powered between about 70 kW and about 100 kW at 126, using a frequency of about 6 kHz to about 10 kHz. In one possible implementation, the power level and frequency during the pour out process 128 may be the same as that used in the pour out delay step 126.

The inventors have appreciated that the use of a frequency of about 3 kHz to about 5 kHz provides controlled cooling during the process step 124, and that the use of the pour out delay step 126 with a higher frequency facilitates shallow depth heating, particularly along the sidewalls of the metal charge 22, whereby certain embodiments provide for about 0.125 cm of melting along the sidewalls of the metal charge 22. This shallow depth heating, in turn, facilitates allowing the metal charge 22 to slide out of the crucible 20 upon tilting. For instance, in certain implementations, the relatively higher frequency employed during the delay step 126 predominantly heats graphite, but may also melt aluminum along the sides of the metal charge 22, for example, to a depth of about 0.15 cm, thereby retaining in large part the material form and structure while facilitating extraction of the metal charge 22 from the crucible 20.

In certain non-limiting embodiments, a cooling power setpoint of about 2 kW can be used, wherein a power value indicated on the potential transformers (PTs) may be about 4 kW 25 kW, and a power value shown on a monitor mounted directly on the coil and providing a coil power reading may indicate about 1 kW during cooling, where the monitor value may be viewed via a human machine interface (HMI, not shown) in certain applications. In this regard, a power monitoring setup may include one or more series components, each undergoing a certain amount of losses between the coil and the power supply, wherein these readings may be different for different setups. In these non-limiting embodiments, moreover, a cooling frequency of about 3.3 to 3.4 kHz may be used, and the frequency may be controlled to about 6.6 kHz to 7.0 kHz during pouring. In certain implementations, moreover, a pouring power level of about 78 kW is typical for power values indicated on the potential transformers, and about 20 kW to 22 kW for the coil power reading from the monitor mounted directly on the coil. In certain implementations, moreover, a power setpoint may be somewhat unimportant where the associated power supply runs at its minimum. In certain implementations, the pouring power may be approximately 20 times the stirring power, wherein the use of a second higher frequency in the second holding step (pour out delay at 126 and FIG. 13) in certain embodiments advantageously ensures that no violent stirring is experienced, as would typically be the case if the initial (first) lower frequency were maintained after stirring and prior to or during pouring. Without wishing to be tied to any particular theory, moreover, at the second higher frequency, not only is there less stirring by virtue of the increased frequency, but also the use of a graphite crucible advantageously acts as more of a shield further reducing the stirring. In certain non-limiting embodiments, moreover, a low power setting may be used during the stirring step at 124 which is just sufficient to stir, but not so high as to reheat.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall therebetween. The disclosure has been described with reference to the preferred embodiments. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

The following is claimed:

1. A method for processing a semi-liquid metal and/or a semi-solid metal, the method comprising:

introducing a semi-liquid metal and/or a semi-solid metal into a crucible that is at least partially encircled by at least one induction coil;

holding the semi-liquid metal and/or semi-solid metal in the crucible while regulating a crucible temperature by controlling the provision of power to the at least one induction coil;

cooling the semi-liquid metal and/or semi-solid metal in the crucible while stirring the semi-liquid metal and/or semi-solid metal in the crucible by providing AC power to the at least one induction coil at a first frequency;

following the cooling and stirring, holding the semi-liquid metal and/or semi-solid metal in the crucible while providing AC power to the at least one induction coil at a second frequency higher than the first frequency to at least partially melt a portion of a metal charge formed of the semi-liquid metal and/or semi-solid metal in the crucible proximate to at least one sidewall of the crucible; and thereafter, tilting the crucible to remove the metal charge from the crucible.

2. The method of claim 1, wherein the second frequency is about 6 kHz or more and about 10 kHz or less.

3. The method of claim 1, wherein the AC power provided during the holding the semi liquid metal and/or semi solid metal in the crucible is relatively higher than the AC power provided during the cooling the semi liquid metal and/or semi solid metal in the crucible.

4. The method of claim 1, wherein the first frequency is about 3 kHz or more and about 5 kHz or less.

5. The method of claim 4, wherein the first frequency is about 3.4 kHz.

6. The method of claim 5, wherein the second frequency is about 6 kHz or more and about 10 kHz or less.

7. The method of claim 6, wherein the second frequency is about 7.3 kHz.

8. The method of claim 4, wherein the second frequency is about 6 kHz or more and about 10 kHz or less.

9. The method of claim 8, wherein the second frequency is about 7.3 kHz.

10. The method of claim 9, wherein the second frequency is about 7.3 kHz.

11. The method of claim 1, wherein the semi-liquid metal and/or semi-solid metal is held in the crucible while providing AC power to the at least one induction coil at the second frequency for about 20 seconds prior to tilting the crucible to remove the metal charge.

12. The method of claim 11, wherein the first frequency is about 3 kHz or more and about 5 kHz or less.

13. The method of claim 12, wherein the first frequency is about 3.4 kHz.

14. The method of claim 12, wherein the second frequency is about 6 kHz or more and about 10 kHz or less.

15. The method of claim 14, wherein the second frequency is about 7.3 kHz.

16. The method of claim 11, wherein the second frequency is about 6 kHz or more and about 10 kHz or less.

17. The method of claim 16, wherein the second frequency is about 7.3 kHz.

* * * * *